US012567957B2

(12) United States Patent　　　　(10) Patent No.:　US 12,567,957 B2
Katz　　　　　　　　　　　　　　　(45) Date of Patent:　　　Mar. 3, 2026

(54) ONE-TIME PAD SYSTEM AND METHOD FOR SECURED AND PRIVATE ON-CLOUD MACHINE LEARNING SERVICES

(71) Applicant: B.G. NEGEV TECHNOLOGIES AND APPLICATIONS LTD., AT BEN-GURION UNIVERSITY, Beer Sheva (IL)

(72) Inventor: Gilad Katz, Tel Aviv (IL)

(73) Assignee: B.G. NEGEV TECHNOLOGIES AND APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 41 days.

(21) Appl. No.: 18/645,954

(22) Filed: Apr. 25, 2024

(65) Prior Publication Data

US 2024/0283640 A1　　　Aug. 22, 2024

Related U.S. Application Data

(63) Continuation-in-part　of　application　No. PCT/IL2022/051112, filed on Oct. 20, 2022.

(30) Foreign Application Priority Data

Oct. 28, 2021　　(IL) ......................................... 287685

(51) Int. Cl.
　　*H04L 29/06*　　　　(2006.01)
　　*G09C 5/00*　　　　(2006.01)
　　　　　　(Continued)

(52) U.S. Cl.
　　CPC .............. *H04L 9/0861* (2013.01); *G09C 5/00* (2013.01); *H04L 9/0662* (2013.01)

(58) Field of Classification Search
None
See application file for complete search history.

(56) References Cited

U.S. PATENT DOCUMENTS 11,074,495 B2 *　7/2021　Zadeh ..................... G06V 10/82
2016/0350648 A1　12/2016　Gilad-bachrach
　　　　　　(Continued)

FOREIGN PATENT DOCUMENTS

CN　　　109684855 A　　　4/2019

OTHER PUBLICATIONS

Chimmula, Vinay Kumar Reddy, et al. Improved Spiking Neural Networks with multiple neurons for digit recognition. 2020 11th International Conference on Awareness Science and Technology (iCAST). https://ieeexplore.ieee.org/stamp/stamp.jsp?tp=& arnumber= 9319475 (Year: 2020).*

(Continued)

*Primary Examiner* — Jeremiah L Avery
(74) *Attorney, Agent, or Firm* — Nixon & Vanderhye PC

(57)　　　　　ABSTRACT

An organization's system is configured to label a given document based on an on-cloud classification service, while maintaining confidentiality of the document's content from all entities external to the organization, including: (a) an encoder configured to receive the given document, and to create an embedding of the given document; (b) a deconvolution unit having a neural network, wherein weights of neurons within the neural network are defined relative to a key, the deconvolution unit is configured to receive the embedding, deconvolve the embedding, thereby to create a scrambled document which is then sent to the on-cloud classification service; (c) a pre-trained internal inference network, configured to: (i) receive from the on-cloud service a cloud-classification of the scrambled document, (ii) to also receive a copy of the embedding, and (ii) to identify, given (Continued)

the received cloud-classification and the embedding copy, a true label of the given document.

40 Claims, 18 Drawing Sheets

(51) Int. Cl.
*H04L 9/06* (2006.01)
*H04L 9/08* (2006.01)

(56) References Cited

U.S. PATENT DOCUMENTS

| | | | | |
|---|---|---|---|---|
| 2020/0036510 | A1 | 1/2020 | Gomez | |
| 2020/0184278 | A1* | 6/2020 | Zadeh | G06N 3/044 |
| 2020/0410404 | A1* | 12/2020 | Imani | H04L 9/085 |
| 2021/0019443 | A1 | 1/2021 | Choi | |
| 2022/0188699 | A1* | 6/2022 | Matlick | G06F 21/6254 |

OTHER PUBLICATIONS

Khidirova, Charos. Comparative Analysis of Artificial Neural Network Training Algorithms. 2020 International Conference on Information Science and Communications Technologies (ICISCT). https://ieeexplore.ieee.org/stamp/stamp.jsp?tp=&amnumber=9351395 (Year: 2020).*

International Search Report for PCT/IL2022/051112, mailed Dec. 22, 2022, 3 pages.

Written Opinion of the ISA for PCT/IL2022/051112, mailed Dec. 22, 2022, 4 pages.

Ji Wang et al., "Not Just Privacy: Improving Performance of Private Deep Learning in Mobile Cloud", InProceedings of the 24th ACM SIGKDD International Conference on Knowledge Discovery & Data Mining, Jul. 19, 2018, pp. 2407-2416.

Ian Goodfellow et al., "Convolutional Networks", Deep Learning, An MIT Press book, Chapter 9, printed Apr. 24, 2024, available at URL: https://www.deeplearningbook.org.

Ian Goodfellow et al., "Autoencoders", Deep Learning, An MIT Press book, Chapter 14, printed Apr. 24, 2024, available at URL: https://www.deeplearningbook.org.

Ian Goodfellow et al., "Representation Learning", Deep Learning, An MIT Press book, Chapter 15, printed Apr. 24, 2024, available at URL: https://www.deeplearningbook.org.

Webpage: "Innovate faster with enterprise-ready AI, enhanced by Gemini models", Vertex AI with Gemini 1.5 Pro, Google Cloud, printed Apr. 24, 2024, 14 pages.

Yitan Zhu et al., "Converting tabular data into images for deep learning with convolutional neural networks", Scientific Reports, vol. 11, No. 1, 2021, 11 pages.

Omid Bazgir et al., "Representation of features as images with neighborhood dependencies for compatibility with convolutional neural networks", Nature Communications, vol. 11, No. 1, 2020, 14 pages.

\* cited by examiner

103a

114

| Number of labels | Top-1 | Top-5 |
|---|---|---|
| 1000 | 67.9% (0.007) | 87.6% (0.006) |
| 100 | 87.2% (0.009) | 96.7% (0.006) |
| 10 | 95.5% (0.019) | 99.9% (0.003) |

Fig. 6

| Metric | Internal Inference to Real Labels |
|---|---|
| Top-1 | 96% (0.015) |
| Top-5 | 99.9% (0.002) |

| Classification number | value |
|---|---|
| Class1 | 1 |
| Class2 | 1 |
| Class3 | 0 |
| class4 | 1 |
| ● | ● |
| ● | ● |
| Classn-1 | 0 |
| Classn | 1 |

Fig. 4

| Dataset | Cloud Architecture | Encoder Architecture | Internal Inference | | | | Cloud Performance Un-encrypted images | |
| | | | Real Labels | | Cloud Class. | | | |
| | | | Top-1 | Top-5 | Top-1 | Top-5 | Top-1 | Top-5 |
| ImageNet | Xception | ResNet101 | 67.9% (0.007) | 87.6% (0.006) | 69.3% (0.008) | 88.8% (0.004) | 77.7% (0.005) | 93.8% (0.004) |
| CIFAR100 | VGG16 | ResNet50V2 | 64.3% (0.013) | 88.5% (0.015) | 58.1% (0.004) | 81.6% (0.015) | 69.5% (0.011) | 90.1% (0.004) |
| CIFAR10 | VGG16 | ResNet50V2 | 86.5% (0.017) | 99.2% (0.004) | 84.8% (0.014) | 98.8% (0.004) | 93.3% (0.009) | 99.8% (0.002) |

Fig. 5

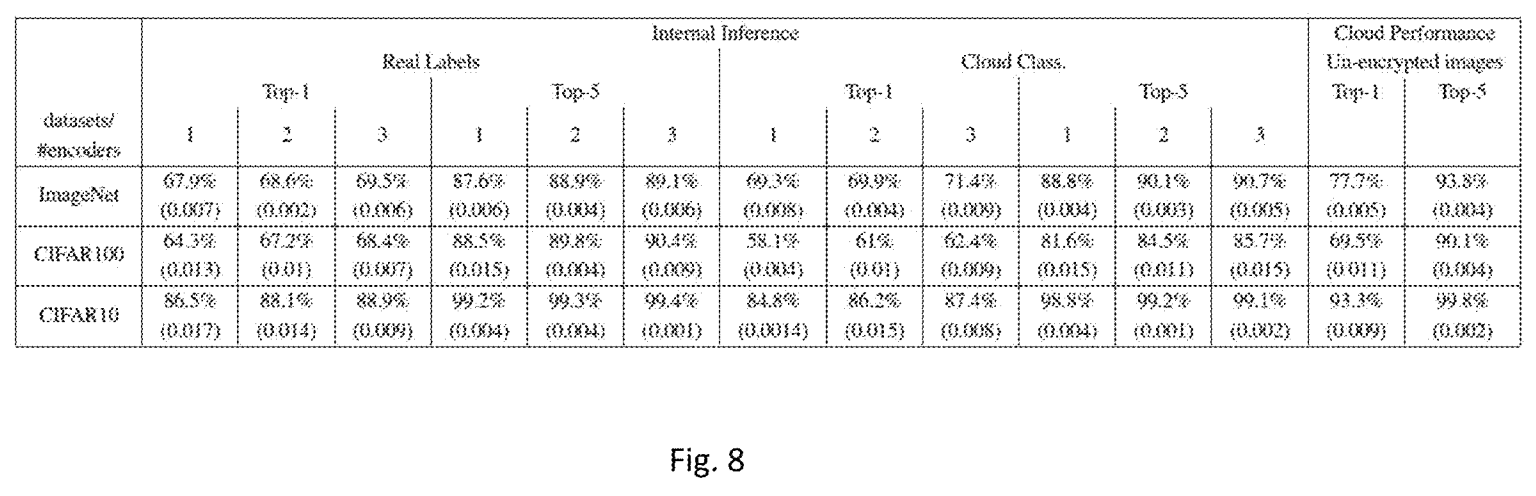

| datasets/ #providers | Internal Inference | | | | | | | | | | | | Cloud Performance Un-encrypted images | |
| | Real Labels | | | | | | Cloud Class. | | | | | | Top-1 | Top-5 |
| | Top-1 | | | Top-5 | | | Top-1 | | | Top-5 | | | | |
| | 1 | 2 | 3 | 1 | 2 | 3 | 1 | 2 | 3 | 1 | 2 | 3 | | |
| ImageNet | 67.9% (0.007) | 68.6% (0.002) | 69.5% (0.006) | 87.6% (0.006) | 88.9% (0.004) | 89.1% (0.006) | 69.3% (0.008) | 69.9% (0.004) | 71.4% (0.009) | 88.8% (0.004) | 90.1% (0.003) | 90.7% (0.005) | 77.7% (0.005) | 93.8% (0.004) |
| CIFAR100 | 64.3% (0.013) | 67.2% (0.01) | 68.4% (0.007) | 88.5% (0.015) | 89.8% (0.004) | 90.4% (0.009) | 58.1% (0.004) | 61% (0.01) | 62.4% (0.009) | 81.6% (0.015) | 84.5% (0.011) | 85.7% (0.015) | 69.5% (0.011) | 99.1% (0.004) |
| CIFAR10 | 86.5% (0.017) | 88.1% (0.014) | 88.9% (0.009) | 99.2% (0.004) | 99.3% (0.004) | 99.4% (0.001) | 84.8% (0.0014) | 86.2% (0.015) | 87.4% (0.008) | 98.8% (0.004) | 99.2% (0.001) | 99.1% (0.002) | 93.3% (0.009) | 99.8% (0.002) |

Fig. 8

| Images Type | Test Loss (MSE) | $\sigma$ |
|---|---|---|
| Original | 0.021 | 0.004 |
| Scrambled | 0.061 | 0.001 |

Fig. 11

ONE-TIME PAD SYSTEM AND METHOD FOR SECURED AND PRIVATE ON-CLOUD MACHINE LEARNING SERVICES

CROSS-REFERENCE TO RELATED APPLICATIONS

This application is a continuation-in-part of International Application No. PCT/IL2022/051112 filed Oct. 20, 2022, which designated the U.S. and claims priority to IL 287685 filed Oct. 28, 2021, the entire contents of each of which are hereby incorporated by reference.

FIELD OF THE INVENTION

The invention relates, in general, to the field of machine learning services conducted between two parties. More particularly, the invention relates to a system structure enabling the provision of machine learning services from the cloud to organizations while maintaining the privacy of the interchanged material between the organization and the service provider.

BACKGROUND OF THE INVENTION

Recent advances in cloud-based machine learning services (CMLS) capabilities have allowed individuals and organizations to access state-of-the-art algorithms that were only accessible to a few until recently. These capabilities, however, come with two significant risks: a) the leakage of sensitive data which is sent for processing by the cloud, and b) the ability of third parties to gain insight into the organization's data by analyzing the output of the cloud's machine learning model.

The term "organization" used herein, refers to any entity, business or otherwise, owned or operated by one or more people. This term should not limit the invention to any type or size of organization.

The accuracy of a machine learning system typically depends on the volume of training it has experienced, among other parameters. However, while many organizations need to classify their documents with high accuracy, their capability of using those high-accuracy machine learning systems that are publicly available in the cloud is limited, mainly due to privacy or secrecy regulations. They are therefore forced to develop and use in-house resources. For example, in many cases, a hospital requiring classifying its images between benign or malignant cannot utilize external resources (even those owned by other hospitals), given the requirement to strictly maintain its patients' data private. When used herein, the term "cloud" refers to a computing facility or service operated by an entity other than the client.

In another aspect, large cloud enterprises own or have access to a vast number (hundreds of millions, even billions) of documents (such as text documents or images). For example, Google Inc. has trained machine-learning systems using a considerable portion of the publicly available internet documents, resulting in a highly accurate classification system. Having such an incredible classification system, Google Inc., like other cloud enterprises, offers its classification capabilities and pre-trained models in the form of remote services over the cloud. To enjoy such services' capabilities, the customer must transfer its documents to the cloud before receiving a respective classification vector for each document sent.

However, as noted, many organizations cannot utilize these high-accuracy and pre-trained services offered over the cloud, given the requirement to strictly keep patients' or customers' privacy or their own commercial secrets confidential.

The prior art has offered three options to allow organizations to use machine learning services over the cloud while maintaining privacy:

a. Use of asymmetric encryption—Sending the data in encrypted form to the cloud. The cloud service decrypts the data, processes it, and sends a classification vector back to the organization in encrypted form. This approach, however, allows the cloud provider unfettered access to the organization's private data and therefore is unacceptable in terms of privacy;

b. Employing homomorphic encryption—Sending the data in a homomorphically encrypted form to the cloud. The cloud service processes the data in its encrypted form and sends an encrypted classification vector back to the organization. While applying a homomorphic encryption technique keeps the data private, even during its processing in the cloud, it suffers from the following drawbacks: (a) it is extremely slow, (b) it requires significantly higher processing capabilities; (c) all operations have to be defined in advance and cooperation is required by both sides; (d) in various cases, the functionality is limited and (e) it puts various additional limitations on the operations that can be performed to prevent its decryption at the end of the process. Other encryption solutions that offer some or all of the capabilities of homomorphic encryption also exist. However, they also require cooperation with the service provider (i.e., the cloud-based service) and often have other prerequisites, such as non-collusion among participating servers or dedicated hardware.

c. Applying a differential privacy technique: This technique introduces a varying degree of noise to the data before sending it to the cloud for processing. While differential privacy techniques prevent attackers from inferring specific details from the data, they do not prevent obtaining a general sense of the processed data and come with the price of reduced performance.

It is an object of the invention to provide a system that enables sending documents to a cloud's machine learning service for classification while maintaining strict privacy and secrecy of the data throughout the entire process.

Another object of the invention is to apply said system's capability to various types of documents, such as image, text, or table-type documents.

It is still another object of the invention to provide a joint system enabling a plurality of separate organizations to train a common-cumulative cloud service and utilize this common service to provide document classification in a manner that each organization keeps its own data secret and private both to the cloud provider and to the other organizations sharing this joint service.

It is still another object of the invention to provide a system that operates in a real one-time pad configuration, where the key is randomly modified for each specific document sent to the cloud, while maintaining a high classification quality.

It is still another object of the invention to provide said system with a simple structure, high reliability, and ease of training.

Other objects and advantages of the invention become apparent as the description proceeds.

SUMMARY OF THE INVENTION

The invention relates to an organization's system configured to label a given document based on an on-cloud classification service, while maintaining confidentiality of the document's content from all entities external to the organization, comprising: (a) an encoder configured to receive the given document, and to create an embedding of the given document; (b) a deconvolution unit having a neural network, wherein weights of neurons within the neural network are defined relative to a key, said deconvolution unit being configured to receive said embedding, deconvolve the embedding, thereby to create a scrambled document which is then sent to the on-cloud classification service; (c) a pre-trained internal inference network, configured to: (i) receive from said on-cloud service a cloud-classification of said scrambled document, (ii) to also receive a copy of said embedding, and (ii) to infer, given said received cloud-classification and said embedding copy, a true label of the given document.

In an embodiment of the invention, the embedding is a reduced size of the given document, and the scrambled document is of increased size compared to said embedding.

In an embodiment of the invention, the type of said given document is selected from text, table, and image.

In an embodiment of the invention, the internal inference network is a machine-learning network trained by (a) a plurality of documents and respective true labels and (b) a plurality of respective cloud classifications resulting from the submission of the same documents, respectively, to a portion of the system that includes said encoder, said deconvolution unit, and said cloud classification service.

In an embodiment of the invention, the key is periodically altered, and the internal inference network is re-trained upon each key alteration.

The invention also relates to a method enabling an organization to label a given document based on an on-cloud classification service while maintaining the confidentiality of the given document's content from all entities external to the organization, comprising: (a) encoding said given document, resulting in an embedding of the given document; (b) deconvolving said embedding by use of a deconvolution unit comprising a neural network, wherein weights of neurons within the neural network are defined relative to a key, thereby to create a scrambled document, and sending the scrambled document to the on-cloud classification service; (c) using a pre-trained internal inference network to: (i) receive from said on-cloud service a cloud-classification of said scrambled document, (ii) to also receive a copy of said embedding, and (iii) to infer, given said received cloud-classification and said embedding copy, a true label of said given document.

In an embodiment of the invention, the embedding is a reduced size of the document, wherein the scrambled document is of increased size compared to said embedding.

In an embodiment of the invention, the type of the given document is selected from text, table, and image.

In an embodiment of the invention, the internal inference network is a machine-learning network trained by a plurality of documents and respective true labels and a plurality of respective cloud classifications resulting from the encoding, deconvolution, and submission to the cloud classification service.

In an embodiment of the invention, the method further comprises periodically altering the key and re-training the internal inference network upon each key alteration.

The invention also relates to a multi-organization system for commonly training a common on-cloud classification service by labeled given documents submitted from all organizations, while maintaining the confidentiality of the documents' contents of each organization from all entities external to that organization, comprising: (A) a training sub-system in each organization comprising: (a) an encoder configured to receive a given document, and to create an embedding of the given document; (b) a deconvolution unit having a neural network, wherein weights of neurons within the neural network are defined relative to a key, said deconvolution unit being configured to receive said embedding, deconvolve the embedding, thereby to create a scrambled document which is then sent for training to the common on-cloud classification service, together with the respective label of that given document.

In an embodiment of the invention, upon completion of the common training by labeled documents from all organizations, the common on-cloud classification service is ready to provide confidential document classifications to each said organizations.

In an embodiment of the invention, during real-time labeling of new documents, each organization's sub-system comprising: (a) an encoder configured to receive a new un-labeled document and to create an embedding of the new document; (b) a deconvolution unit having a neural network, wherein weights of neurons within the neural network are defined relative to a key, said deconvolution unit being configured to receive said embedding, deconvolve the embedding, thereby to create a scrambled document which is then sent to the on-cloud classification service; (c) a pre-trained internal inference network, configured to (i) receive from said on-cloud service a common cloud-classification vector of said scrambled document, (ii) to also receive a copy of said embedding, and (iii) to infer, given said received common cloud-classification vector and said embedding copy, a true label of said un-labeled document.

In an embodiment of the invention, the embedding is a reduced size of the new document, and the scrambled image is of increased size compared to said embedding.

In an embodiment of the invention, the document type is selected from text, table, and image.

In an embodiment of the invention, the internal inference network of each organization is a machine-learning network that is trained by (a) a plurality of documents and respective true labels and (b) a plurality of respective common cloud classification vectors resulting from the encoding, deconvolution, and transfer through the common cloud classification service.

In an embodiment of the invention, the key in each organization is periodically altered, and each organization's internal inference network is re-trained upon each key alteration.

In an embodiment of the invention, the system is adapted for labeling a text document, wherein: (a) said text document is separated into a plurality of sentences; (b) each sentence is inserted separately into said encoder as a given document; and (c) the pre-trained internal inference network infers a true label of each said sentences, respectively.

In an embodiment of the invention, the system is adapted for labeling a given table-type document, wherein: (a) the encoder has the form of a row/tuple to image converter; (b) the encoder receives at its input separately each row of said given table-type document; and (c) the pre-trained internal inference network infers a true label of each said rows, respectively.

In an embodiment of the invention: (a) additional documents, whose labels are known, respectively, are fed into the encoder in addition to the given document; (b) a concatenation unit is used to concatenate distinct embeddings created by the encoder for said given document and said additional documents, thereby to form a combined vector V; (c) the combined vector V is fed into the deconvolution unit; and (d) the pre-trained internal inference network, is configured to: (i) receive from the on-cloud service a cloud-classification of said scrambled document, (ii) to also receive a copy of the embedding, and a label of each of the additional documents; and (iii) to infer a true label of the given document based on the received cloud-classification, the labels of each the additional documents, and the embedding copy.

The invention also relates to an organization's system configured to label a given document based on an on-cloud classification service, while maintaining confidentiality of the given document's content from all entities external to the organization, comprising: (A) a first encoder configured to receive the given document, and to create an embedding of the given document; (B) a deconvolution unit having a neural network, wherein weights of neurons within the neural network are defined relative to a key, the deconvolution unit being configured to receive the embedding, deconvolve the embedding, thereby to create a scrambled document which is then sent to the on-cloud classification service; (C) a pre-trained internal inference network, configured to: (a) receive from the on-cloud service a cloud-classification of the scrambled document, (b) to also receive a copy of the embedding, (c) to also receive activations vector reflecting activations created at the deconvolution unit during transfer of the embedding through it, and (d) to infer, given the received cloud-classification, the embedding copy, and the activations vector, a true label of the given document; wherein the key is a unique key which is randomly generated for each document.

In an embodiment of the invention, the activations vector is a vector compressed relative to the entire activations created during the passage of the embedding through the deconvolution unit, and wherein the compression is performed by a second encoder.

In an embodiment of the invention, the second encoder is a trained or untrained encoder.

In an embodiment of the invention, the embedding is a reduced size of the given document, and wherein the scrambled document is of increased size compared to the embedding.

In an embodiment of the invention, a type of the given document is selected from text, table, and image.

In an embodiment of the invention, the internal inference network is a machine-learning network that is trained by: (i) a plurality of documents embeddings and and respective true labels, (ii) the activations vectors, respectively, and (iii) a plurality of respective cloud classifications resulting from submission each of the plurality of the documents, respectively, to a portion of the system that includes the first encoder, the deconvolution unit, and the cloud classification service.

The invention also relates to a method for enabling an organization to label a given document based on an on-cloud classification service, while maintaining confidentiality of the given document's content from all entities external to the organization, comprising: (A) encoding the given document, resulting in an embedding of the given document; (B) deconvolving the embedding by use of a deconvolution unit comprising a neural network, wherein weights of neurons within the neural network are defined relative to a key, thereby to create a scrambled document, and sending the scrambled document to the on-cloud classification service; and (C) using a pre-trained internal inference network to: (a) receive from the on-cloud service a cloud-classification of the scrambled document, (b) to also receive a copy of the embedding, (c) to also receive activations vector reflecting activations created at the deconvolution unit during transfer of the embedding through it, and (d) to infer, given the received cloud-classification, the embedding copy, and the activations vector, a true label of the given document; wherein the key is a unique key which is randomly generated for each document.

In an embodiment of the invention, the activations vector is a vector compressed relative to the entire activations created during the passage of the embedding through the deconvolution unit, and wherein the compression is performed by a second encoder.

In an embodiment of the invention, the embedding is a reduced size of the document, and wherein the scrambled document is of increased size compared to the embedding.

In an embodiment of the invention, a type of the given document is selected from text, table, and image.

In an embodiment of the invention, the internal inference network is a machine-learning network that is trained by (i) a plurality of documents and respective true labels, and (ii) a plurality of cloud classifications resulting from the encoding, deconvolution, and transfer of same documents, respectively, through the cloud classification service.

The invention also relates to a multi-organization system for commonly training a common on-cloud classification service by labeled given documents submitted from all organizations, while maintaining confidentiality of the documents' contents of each organization from all entities external to that organization, comprising: a training sub-system in each organization comprising: (a) a first encoder configured to receive a given document, and to create an embedding of the given document; (b) a deconvolution unit having a neural network, wherein weights of neurons within the neural network are defined relative to a key, the deconvolution unit being configured to receive the embedding, deconvolve the embedding, thereby to create an activations vector which is then sent for training to the common on-cloud classification service, together with the respective label of that given document; wherein the key is a unique key which is randomly generated for each document.

In an embodiment of the invention, upon completion of the common training by labeled classification vectors from all organizations, the common on-cloud classification service is ready to provide confidential documents' classifications to each said organizations.

In an embodiment of the invention, during run-time labeling of new documents, each organization's sub-system comprising: (A) a first encoder configured to receive a new un-labeled document, and to create an embedding of the new document; (B) a deconvolution unit having a neural network, wherein weights of neurons within the neural network are defined relative to the key, said deconvolution unit being configured to receive the embedding, deconvolve the embedding, thereby to create an activations vector which is then sent to the on-cloud classification service, which given the activations vector, returns the label of the document.

In an embodiment of the invention, the on-cloud classification service, during training, further receives scrambled documents created by the deconvolution unit, and during run-time, the on-cloud classification service also further receives scrambled documents that are created by the deconvolution unit.

In an embodiment of the invention, the embedding is a reduced size of the new document, and wherein the scrambled image is of increased size compared to the embedding.

In an embodiment of the invention, a type of the document is selected from text, table, and image.

The invention also relates to a system particularly adapted for labeling a text document, wherein: (a) the text document is separated into a plurality of sentences; (b) each sentence is inserted separately into the first encoder as a given document; and (c) the pre-trained internal inference network infers a true label of each said sentences, respectively.

The invention also relates to a system particularly adapted for labeling a given table-type document, wherein: (a) the first encoder has the form of a row/tuple to image converter; (b) the first encoder receives at its input separately each row of the given table-type document; and (c) the pre-trained internal inference network infers a true label of each said rows, respectively.

In an embodiment of the invention, (a) additional documents, whose labels are known, respectively, are fed into the first encoder, in addition to the given document; (b) a concatenation unit is used to concatenate distinct embeddings created by the first encoder for the given document and the additional documents, thereby forming a combined vector V; (c) the combined vector V is fed into the deconvolution unit; and (d) the pre-trained internal inference network is configured to: (i) receive from the on-cloud service a cloud-classification of the scrambled document, (ii) to also receive a copy of the embedding, and a label of each said additional documents; and (iii) to infer a true label of the given document based on the received cloud-classification, the labels of each said additional documents, and said embedding copy.

BRIEF DESCRIPTION OF THE DRAWINGS

In the Drawings:

FIG. 4 shows an example of a common classification vector, as produced by the common cloud machine learning system of FIG. 3;

FIG. 5 presents some experimental results (Use Case 1 Results);

FIG. 6 presents additional experimental results (use Case 2 IIN's accuracy compared to "ground truth");

FIG. 7 presents additional experimental results (use case 3—results on "ground truth");

FIG. 8 presents experimental results (use case 4 results demonstrating the effect of using multiple Encoders on the performance);

FIG. 11 shows additional experimental results (the auto-encoder's reconstruction loss when applied on original and scrambled images);

DETAILED DESCRIPTION OF PREFERRED EMBODIMENTS

As noted, the "cloud" now offers a variety of machine learning services that are much superior to local services, particularly given their mass pre-training with billions of documents, a volume any local individual organization cannot reach. However, these cloud-based services are out of bounds to many organizations, given their documents' secrecy and privacy limitations. The prior art has suggested three types of solutions, for example, (a) the use of asymmetric encryption; (b) the employ of homomorphic encryption; and (c) the application of a differential privacy technique; However, all these three solutions have fallen short of providing a satisfactory solution in terms keeping the secrecy and privacy of the documents, and computation requirements.

Figure 1:
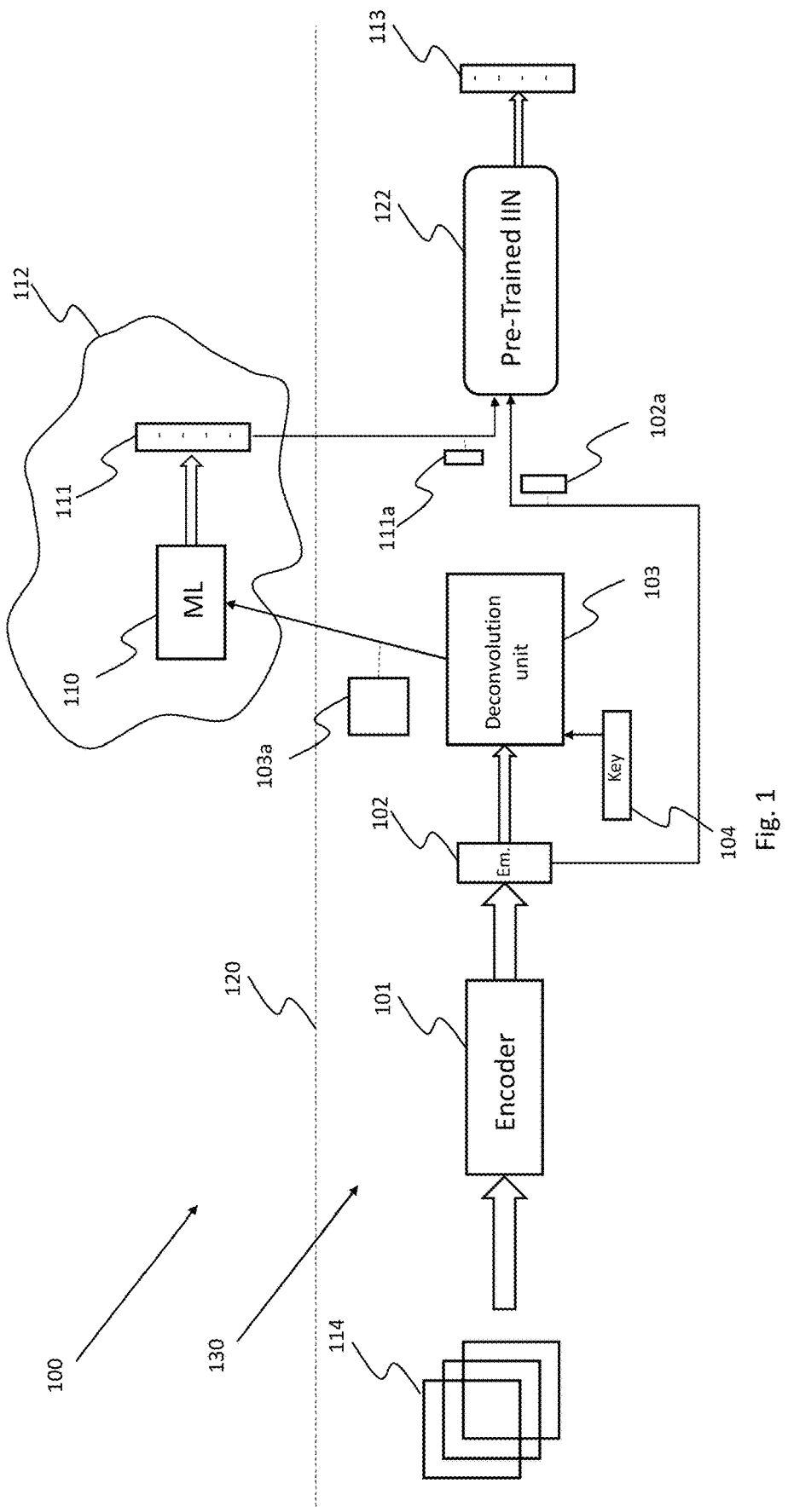
FIG. 1 illustrates a structure of a first embodiment of the system of the invention in a block diagram form.

FIG. 1 illustrates the structure of a first embodiment of the invention in a block diagram form. For example, an organization 130 located below the virtual line 120 needs classification of its documents 114 (in this specific embodiment, each document is an image). Given the superior machine-learning services offered by the cloud system 112, the organization wishes to utilize system 112 while maintaining secrecy and privacy by not exposing its documents to any external entity (schematically indicated above the secrecy line 120).

Each document 114, in the form of an n×n matrix, is separately fed into encoder 101; each matrix value represents a B/W or RGB pixel value (in the case of RGB, the document is typically represented by three respective matrices). Encoder 101 is a non-linear machine-learning unit that serially applies a plurality of pre-defined filters on the document (for example, performing convolution operations), resulting in an embedding representation 102 of the original document. Filtering, in general, and convolution, in particular, are well-known machine learning operations (see, for example, https://www.deeplearningbook.org/, chapter 9). The result of the filtering operations by encoder 101 is a reduced (embedding) representation matrix 102 of dimensions a×b of the original document 114, where dimensions a and b are smaller than n. Moreover, a 3-matrix RGB representation may be reduced in the embedding to a single-matrix representation. Embedding 102 is then fed into a deconvolution unit 103, another multi-stage non-linear machine-learning module that performs on embedding 102 a generally opposite operation relative to that of encoder 101. More specifically, while encoder 101 reduces the dimensions of matrix-image 114, the deconvolution unit 103 increases (i.e., "inflates") the dimensions of embedding 102 to form a matrix 103a with dimensions c×d, where each of c and d is relatively close (or the same) as each original dimension n. In some cases, c may equal d; however, this is not a requirement. Furthermore, while the original image matrix 114 is preferably square, this is also not a requirement.

A variety of commercially available pre-trained encoders capable of creating embeddings of images may be used, such as VGG-16, VGG-19, multiple ResNet architectures, Xception, etc. As discussed below, to test the system of the invention, the inventors used ResNet101 and ResNet50 (see FIG. 5) as the encoder.

The deconvolution unit 103 is a multi-stage neural network, where each of the network's neurons has its unique weight. According to the invention, each neuron's weight depends on secret key 104 (which may be altered from time to time). For example, key 104 may include millions of different weights; however, there is no limitation to the number of weights that may be used. Therefore, deconvolution unit 103 creates an image 103a, for example, with relatively similar dimensions to those of the original image 114. It should be noted that there is no limitation to the size of image 103a in terms of pixels (from now on, for the sake of convenience, it is assumed that images 103a have the same dimensions as image 114). The deconvolved image 103a, however, includes gibberish values compared to those of the original image-matrix 114, given the non-linear and substantially random effect of the deconvolution. Although these gibberish values "scramble" the image, some features of embedding matrix 102 and of the original image matrix 114 remain within the deconvolved image 103a. Embedding is a well-known subject in machine learning and can be found at https://www.deeplearningbook.org/. Deconvolution is also a well-known subject in machine learning and can be found, for example, in https://www.deeplearningbook.org/, chapters 14-15).

Figures 2A, 2B:
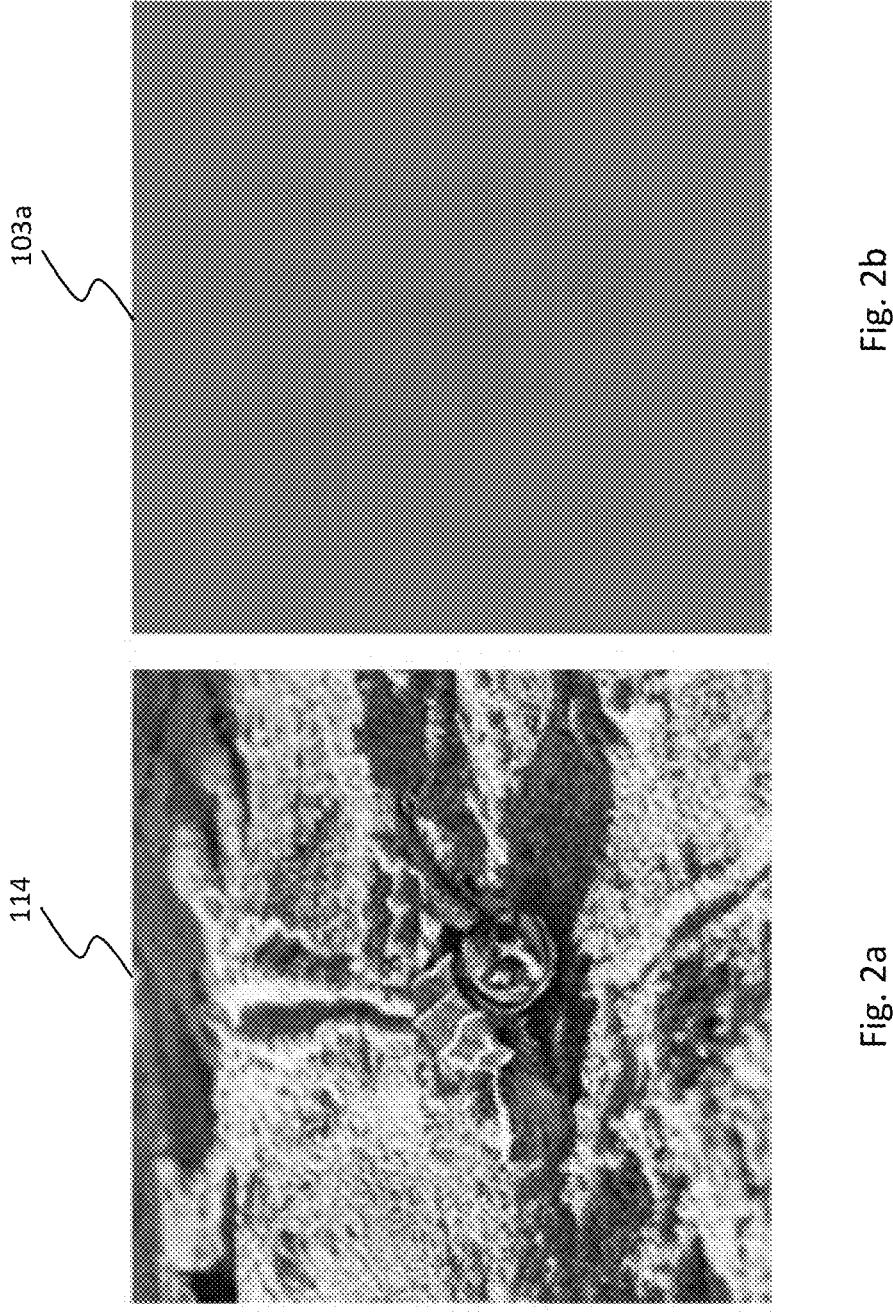
FIG. 2a shows an example of an original image 114.
FIG. 2b shows the image of FIG. 2a after subjection to an encoder and a deconvolution unit.

FIG. 2a shows an example of an original image 114. FIG. 2b shows the same image 114 after subjection to encoder 101 and deconvolution unit 103, forming the scrambled image 103a. As can be seen, none of the features of the original image 114 can be visually recognized in scrambled (deconvolved) image 103a. The scrambled (deconvolved) image 103a is then sent to cloud 112 for classification.

As noted, deconvolution unit 103 increases the embedding matrix by several size orders, forming a one-time pad. The fact that the neurons' weights within the deconvolution unit 103 are replaced from time to time (the preferred rate of key 104 replacement is discussed hereinafter) prevents any practical way to decrypt the image at the cloud, given only the deconvolved image.

Cloud machine learning (ML) service 110 is a mass-trained classification system, for example, Google's Auto Machine Learning services such as Vertex AI (https://cloud-.google.com/vertex-ai), etc. ML system 110 is pre-trained (in this case by billions of images) to output a respective classification (or label) for each inputted image. For example, when system 110 receives image 114 of FIG. 2a, it is trained to output one or both of the labels "turtle" or "animal".

However, based on the invention, the ML machine 110 is fed by a scrambled image 103a (such as the one shown in FIG. 2b) rather than the original image 114 (such as in FIG. 2a). While image 103a looks entirely scrambled, it still possesses features from the embedded image 102 and the original image 114. ML 110 processes each scrambled image 103a in a typical manner, resulting in some classification vector 111. However, given the "scrambling" that image 103a was subjected to (by encoder 101 and deconvolution unit 103), the resulting classification vector 111 differs from the expected classification vector should the original image 114 be submitted to the ML machine 110 instead.

The determined classification vector 111 is conveyed to the organization's system 130 and submitted as vector 111a into an internal inference network (IIN) 122. IIN 122 is a machine learning unit that is pre-trained to convert each "deconvolved image" classification vector 111a ("deconvolved image" classification vector is defined as a classification vector issued by ML 110 for a deconvolved inputted image 103a) to a respective correct classification vector 113. More specifically, given each specific embedding 102 (or 102a, which is the same), respective cloud deconvolved image classification vector 111a, and the known classification (label) for each image used in the training, IIN 122 is trained to issue the correct classification vector for a respective image 114. Correct vector 113 is the classification vector that the cloud system would have issued, should the original image 114 have been submitted to it rather than the deconvolved image 103a. It should be noted that a new pre-training of the IIN should be made for each specific key 104 if and when a new key is used (as the key highly affects the deconvolved image 103a). The IIN 122 is the only unit within the organization's system 130 that is trained (encoder 101 may be off a shelf product). The training of the IIN 122 is relatively simple and may require a few thousand images. In a test performed by the inventors on a laptop computer, 4,500 images were found sufficient, and the IIN training was completed within about 5 minutes.

To train the IIN securely, organization 130 requires a relatively small dataset D of correctly labeled images. During the training, images D are encoded (by encoder 101) to form respective embeddings, scrambled (by deconvolution unit 103), and sent to the cloud. The cloud service 110 issues a deconvolved-image classification vector, respectively, for each scrambled image from dataset D. The deconvolved-image classification vectors are sent back to organization 130. Then, the embedding of each image (i.e., the output of encoder 101) and the respective deconvolved-image classification vector 111 are used to train the IIN to predict (during run-time) the correct label of the original image, based on the respective embedding and deconvolved-image classification vectors. The requirement from the organization to have a small labeled dataset of images for the training is reasonable since most organizations have proprietary knowledge they wish to protect; therefore, they can leverage these images for the training of IIN 122. If such a dataset is unavailable, the organization may use publicly available images for the training.

One-time pad encryption (OPE) is known to be unbreakable as long as a) it has the same or longer length than the text before encryption; and b) it is used only once. The invention's approach applies an OPE-like structure, however, with several modifications: To break the system, a hacker needs to determine the parameters of the deconvolution unit, which is a neural network. Studies have shown that extremely great computational efforts are needed to extract the parameters (i.e., the deconvolution unit's key of FIG. 1) of a deep architecture, such as a neural network. This is the case even if a small neural network is used for the deconvolution unit (and in any case, the size of the deconvolution unit is not limited and can be very large, for example, millions of weights). Furthermore, deconvolution unit 103 may apply, for example, a ReLu activation function. Using a ReLU activation function means that negative values generated throughout the network are transformed to zero. When used, this network characteristic adds another layer of complexity to an attacker, given that multiple input parameter configurations can be used to generate the same output deconvolution matrix result 103*a*. An analysis by the inventors has shown that, on average, 59% of the neurons of the deconvolutional network output a zero result for any input they receive. A comprehensive empirical analysis providing a proposed bound for the number of images that each given key can safely scramble is provided hereinafter.

Figure 13:
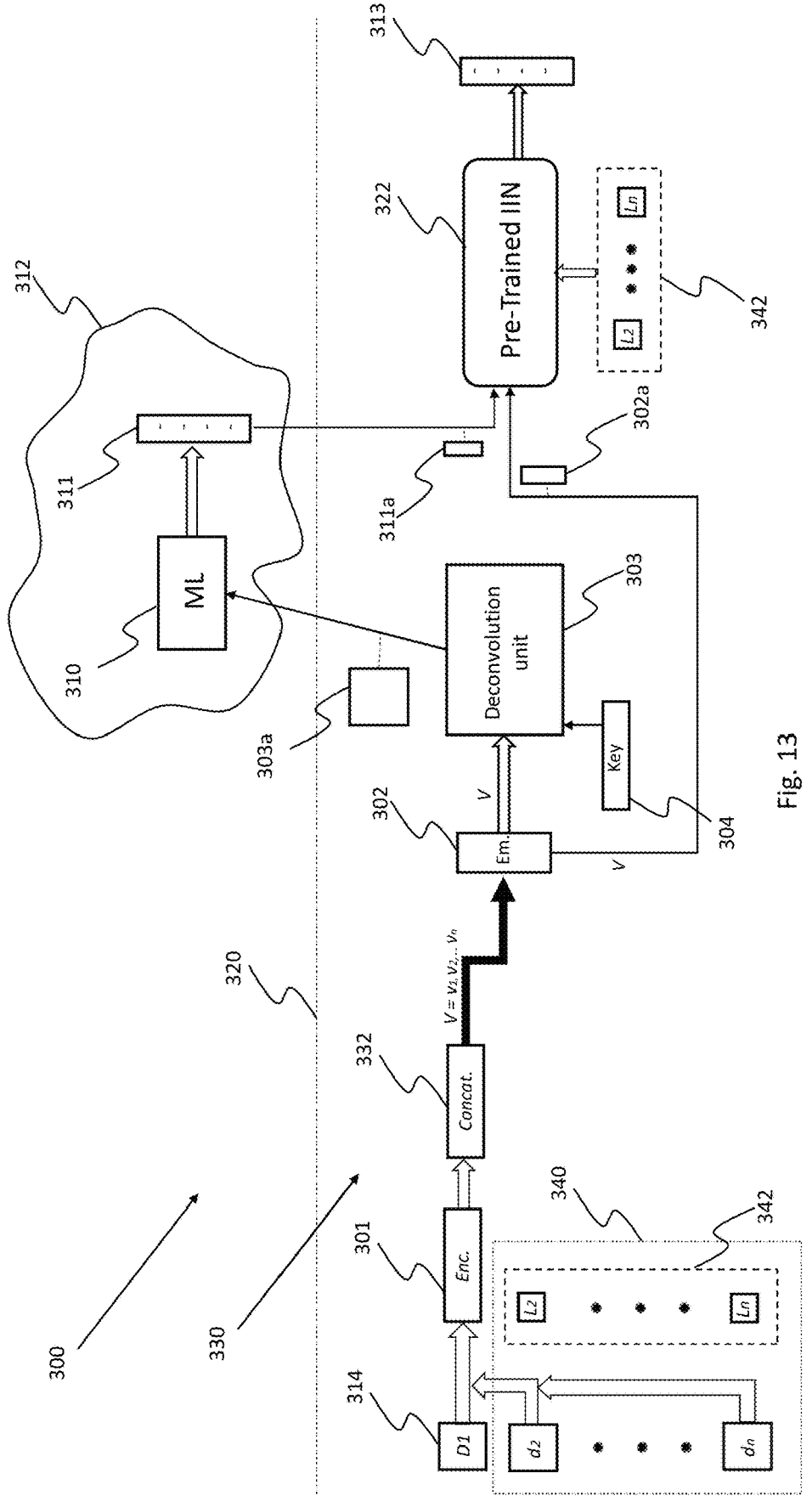
FIG. 13 illustrates a structure of a second embodiment of the system of the invention in a block diagram form.

FIG. 13 illustrates a structure of a second embodiment of the system of the invention in a block diagram form. System 300 of FIG. 13 is even more protected against cyber cracking than system 100 of FIG. 1. Indices within FIG. 13 that are similar to those in FIG. 1 serve the same functionality; therefore, only differences in respective functionalities, whenever they exist, will be discussed. Database 340 stores a collection of pre-labeled images. The images d within database 340 may be random and not connected or correlated to images 314 that need to be labeled by system 300. In operation, and as before, an image $D_1$ is submitted into encoder 301, resulting in a sub-vector $v_1$. However, while in the scheme of FIG. 1, sub-vector $v_1$ formed the embedding 102, in the present scheme, sub-vector $v_1$ is temporarily saved within concatenating unit 332. The set $d_2, d_3, \ldots d_n$ is a set that may be randomly selected from the database 340. Following the formation and saving of sub-vector $v_1$, the documents $d_2, d_3, \ldots d_n$ are similarly and serially submitted into encoder 301, forming sub-vectors $v_2, v_3, \ldots v_n$, respectively, that are also saved. n may be any number, for example, 10. Upon availability of all the sub-vectors $v_1, v_2, v_3, \ldots v_n$, concatenating unit 332 concatenates all these sub-vectors, forming a unified vector V (of course larger compared to each said sub-vectors). The concatenated vector V now forms the embedding 302, which is submitted, as before, into deconvolution unit 303. Deconvolution unit 303 deconvolves the vector V, converting it into a deconvolved image 303*a*, having substantially the same dimensions as each image $D_1, d_2, d_3, \ldots d_n$. More specifically, while in the scheme of FIG. 1, the deconvolution unit 103 inflated the relatively small embedding 102 returning it substantially to the dimensions of image 114, in the present scheme, the deconvolution unit 303 less, or not at all, inflates the larger vector (embedding) V in order to return to the dimensions of image 314 (as they are already about the same dimensions). However, the deconvolution unit still performs the deconvolution conversion. In any case, the resulting deconvolved image 303*a* is submitted to the cloud service 312. Similarly to the scheme of FIG. 1, the ML machine 310 is fed by a scrambled image 303*a* (such as the one shown in FIG. 2*b*) rather than the original image 314 (such as in FIG. 2*a*).

While image 303*a* looks entirely scrambled, it still possesses features from the embedded image 302. and from the original image 114 combined with images $d_2, d_3, \ldots d_n$. ML 310 processes each scrambled image 303*a* in a typical manner, resulting in a classification vector 311. However, given the "scrambling" that image 303*a* was subjected to (by encoder 301, concatenation with images $d_2, d_3, \ldots d_n$ and the deconvolution unit 303), the resulting classification vector 311 differs from the expected classification vector should the original image 314 were submitted to the ML machine 310 instead.

The determined classification vector 311 is conveyed to the organization's system 330 and submitted as vector 311*a* into an internal inference network (IIN) 322. IIN 322 is a machine learning unit that is pre-trained to convert each "deconvolved image" classification vector 311*a* to a respective correct classification vector 313. Given (1) each specific embedding 302 (or 302*a*, which is the same), (2) the known labels $L_2, L_3, \ldots L_n$—342, and (3) respective cloud deconvolved image classification vector 311*a*, pre-trained IIN 322 issues the correct classification vector 313 for a respective image 314. Correct label vector 313 is the classification vector that the cloud system would have issued, should the original image 314 have been submitted to it rather than the deconvolved image 303*a*. It should be noted that a new pre-training of the IIN should be made for each specific key 304 if and when a new key is used (as the key highly affects the deconvolved image 303*a*). Again, the IIN 322 is the only unit within the organization's system 330 that is trained (encoder 301 may be off a shelf product). As before, the training of the IIN 322 is relatively simple and may require a few thousand images. The training is substantially the same as in the system of FIG. 1. The amount of input is larger (as the IIN 322 also receives the embeddings and labels of the random images), so the INN is larger in structure, but the procedure itself is the same. It typically takes a somewhat longer time to train.

It should be noted that the concatenation of the vectors $v_1, v_2, v_3, \ldots v_n$ into a single vector V is not a necessity. Since the INN 322 is a dense neural network, from a practical standpoint, there is no difference if the concatenation is performed or whether the vectors $v_1, v_2, v_3, \ldots v_n$ are individually introduced into the IIN. In this type of INN architecture, each value in the input layer is propagated to all neurons in the subsequent layer. It doesn't matter if the input vectors are separated or concatenated—all neurons receive all inputs. However, the order needs to be consistent across samples.

It should be noted that the set $d_2, d_3, \ldots d_n$ is preferably randomly selected from a larger images dataset (database) 340 and replaced for each new image 314 at the input. This random selection strengthens the confidentiality level of the system.

Figure 14:
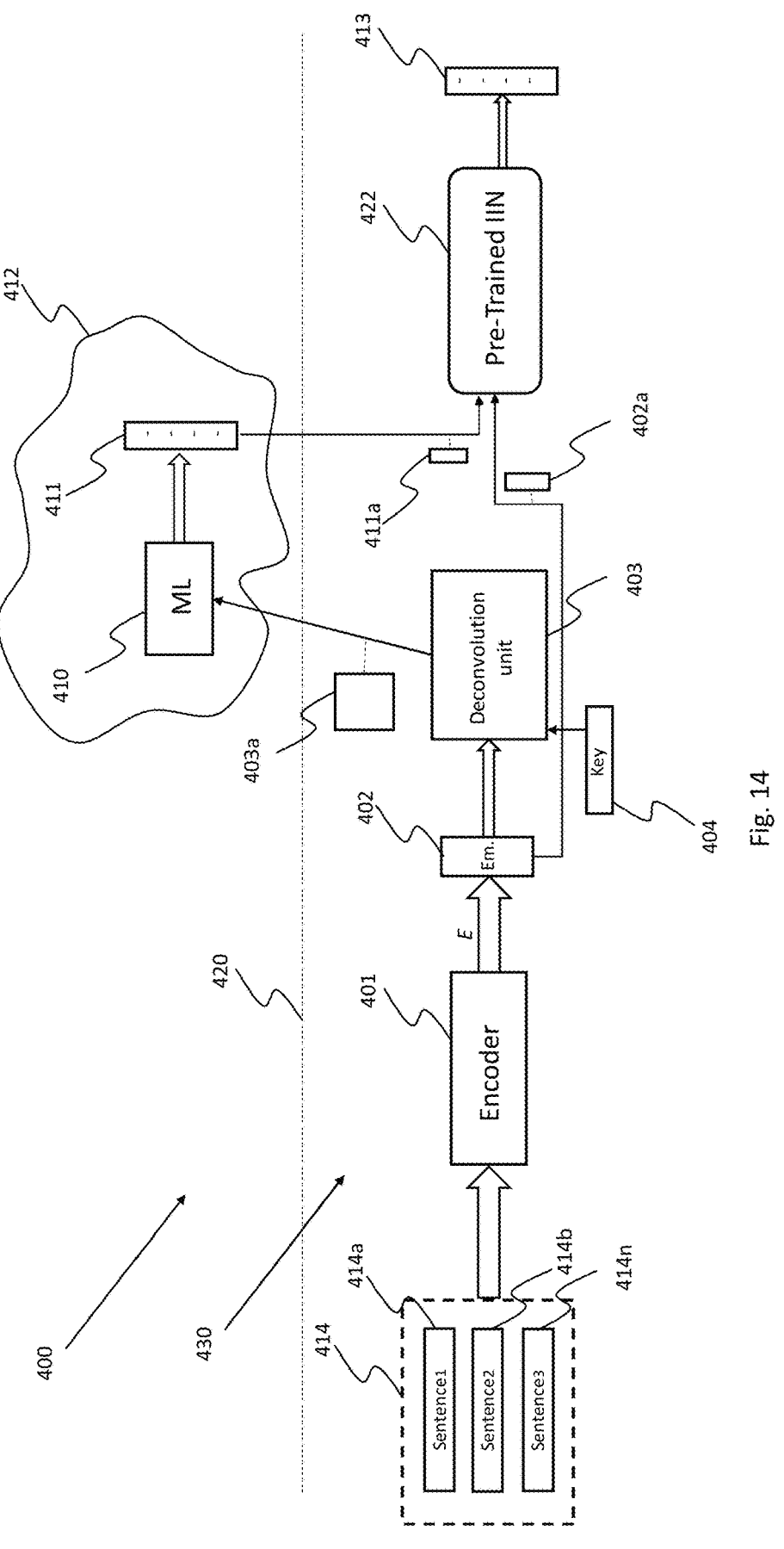
FIG. 14 describes a system for classifying sentences utilizing an image-dedicated cloud-based service.

So far, the description showed how the cloud machine learning (ML) service (110 or 310) can be utilized to classify images remotely while keeping the secrecy and privacy of the input images (114 or 314). The cloud machine learning (ML) classifying service (110 or 310) is an image-dedicated unit, as it has been mass-trained by a vast number of images. The inventors have found that the same image-dedicated cloud machine-learning service can also be utilized to classify text. A sentence is the smallest text unit from which a conception can be made. FIG. 14 describes a system 400 for classifying sentences, utilizing an image-dedicated cloud-based service 412. Indices within FIG. 14 that are similar to those in FIG. 1 serve the same functionality; only differences in respective functionalities, whenever they exist, will be discussed. The text unit 414 is separated into sentences -Sentence$_1$, Sentence$_2$, . . . Sentence$_n$, respectively. Each sentence is conveyed separately into encoder 401, which forms an image-embedding 402. Given the image-embedding 402, the system operates the same as the system of FIG. 1, resulting in a sentence classification 413. More specifically, each output classification 413 is a vector that classifies the respective image at the input.

Figure 15:
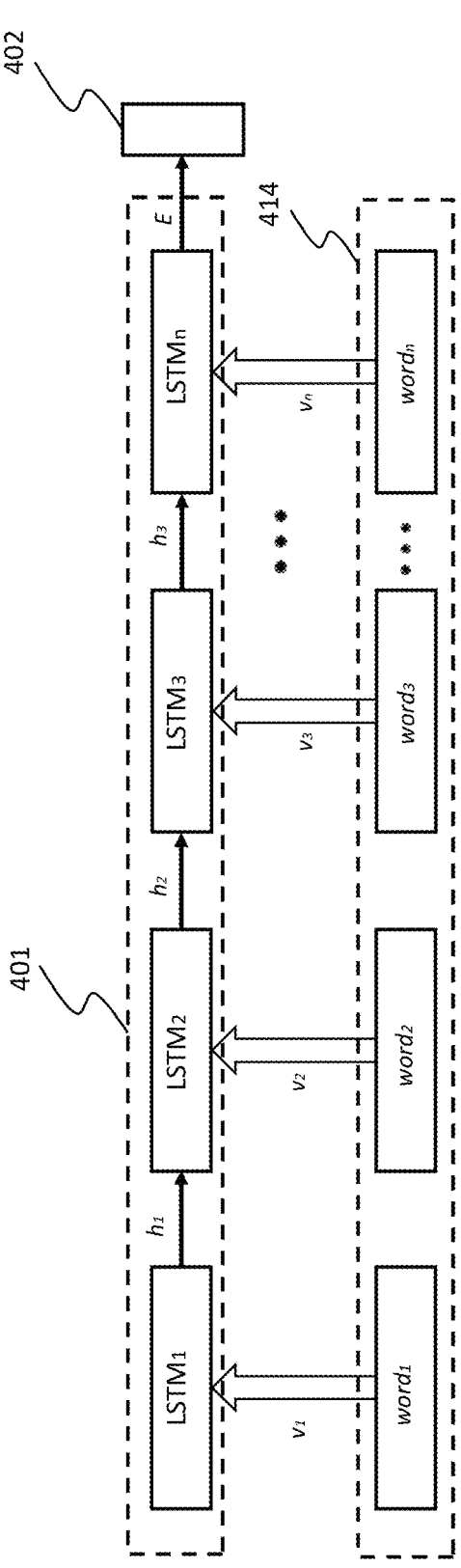
FIG. 15 illustrates in a block diagram form a structure of an encoder that may be used within the system of FIG. 14.

The structure of encoder 401 is described in FIG. 15. Each sentence 414 is composed of a plurality of words word$_1$, word$_2$, word$_3$, . . . word$_n$. Each word is converted into a respective vector $v_1$, $v_2$, $v_3$, . . . $v_n$. The conversion of the words to separate vectors is performed utilizing any known word-to-vector converter, such as Word2vec, or Glove. Word2vec, for example, is a technique for natural language processing published in 2013. The word2vec algorithm utilizes a neural network model to learn word associations from a large corpus of text. Once trained, this model can detect, for example, synonymous words or suggest additional words for a partial sentence. As the name implies, word2vec represents each distinct word with a particular list of numbers called a vector. The vectors are chosen carefully such that a simple mathematical function (the cosine similarity between the vectors) indicates the level of semantic similarity between the words represented by those vectors. Initially, the first vector vi is fed into a respective LSTM$_1$ unit. An LSTM (long-short-term memory) unit is an artificial neural network used in artificial intelligence and deep learning. Unlike standard feedforwardneuralnetworks, LSTM has feedback connections. Such a recurrent neural network (RNN) can process not only single data points (such as images) but also entire sequences of data (such as speech or video). For example, LSTM applies to tasks such as unsegmented, connected handwriting recognition, speech recognition, machine translation, robot control, video games, and healthcare. LSTM, which is just one of an entire family of architectures that operate in this way, has become the most cited neural network of the 20th century. Any other architecture that can process sequential data is applicable for the purpose of the invention. For example, a so-called "Transformer", which is a state-of-the-art architecture, may be used for that purpose. LSTM is mainly structured to handle serial inputs. Given vector $v_1$, LSTM$_1$ outputs a respective hidden state $h_1$ which is conveyed to the next stage LSTM$_2$ unit. Next, given $h_1$, LSTM$_1$ unit receives the second-word vector $v_2$, and outputs a second hidden vector $h_2$, which is conveyed to LSTM$_3$. This procedure repeats for all the words in sentence 414, finalizing with word$_n$. At the end of the procedure, LSTM$_n$ outputs a vector embedding E, which is the embedding 402 of system 400 of FIG. 14. Back to FIG. 14, and given the embedding 402 (that may optionally be further processed/transformed so that its dimensions are compatible with the input dimensions required for the deconvolution), deconvolution unit 403 deconvolves the embedding 402, resulting in a deconvolved image 403$a$, which is sent to cloud service 412. As before, the cloud service classifies the deconvolved image 403 and returns a classification 411$a$ to the pre-trained IIN 422. Given the embedding 402$a$ and the classification 411$a$, the IIN 422 outputs a correct classification 413, which is the classification of sentence 414. The IIN 422 is pre-trained by known sentences to output a correct classification given the two inputs: (a) cloud classification 411$a$; and (b) the embedding 402$a$. As described, system 400 of FIG. 14 utilizes the very accurate cloud classification service 412 to classify each sentence 414.

The system of FIGS. 14 and 15 can be used to perform additional text-related tasks, such as entity identification, sentiment analysis, parts of speech tagging, etc. Therefore, when used in relation to the system of FIGS. 14 and 15, the terms "classification" and "labeling" also encompass these text-related tasks.

Experiment

An experiment of system 400 of FIG. 14 has shown that the classification accuracy is substantially the same as that of a local system trained on the same text.

The experiments were performed on a dataset of several thousand documents. Each document consisted of a paragraph discussing a single topic. Overall, there were 10 topics in the dataset. The task that the inventors aimed to perform was to classify each document, i.e., assign it with its true label. In the experiment, an 80/20 train/test split, respectively was used. For the preliminary embedding, a Word2Vec model was used. For the cloud model, the Xception architecture, which was trained on the ImageNet dataset was used. The INN consisted of two dense layers and a softmax operation. The performance obtained by this approach (i.e., experiment) was statistically indistinguishable from the classification of an LSTM model directly trained on the original text.

The invention is also applicable to the classification of table-oriented data. In contrast to typical images where the locations of pixel data are meaningful, in table-oriented data that are directly converted to an image, there is no meaning to the locations of the specific pixels. For example, switching column locations in table data (as it appears within an image) does not affect the table's meaning; however, it affects its appearance (in contrast to the case of a typical image where a change of pixels locations changes the image's meaning). Therefore, adaptation in the system of FIG. 1 is required to enable secret and private cloud classification of table-oriented data.

There are known techniques for converting table-oriented data to meaningful images. Such techniques are discussed, for example, in:

(a) Zhu, Yitan, Thomas Brettin, Fangfang Xia, Alexander Partin, Maulik Shukla, Hyunseung Yoo, Yvonne A. Evrard, James H. Doroshow, and Rick L. Stevens, "Converting tabular data into images for deep learning with convolutional neural networks"; Scientific reports, 11 no. 1 (2021): 1-11; and (b) Bazgir, Omid, Ruibo Zhang, Saugato Rahman Dhruba, Raziur Rahman, Souparno Ghosh, and Ranadip Pal. "Representation of features as images with neighborhood dependencies for compatibility with convolutional neural networks"; Nature communications, 11 no. 1 (2020): 1-13.

Typically, these techniques generate $n^2$ images from a table containing n×n data cells (an image for each cell). Then, each of these generated images can be fed as an image 114 into the system of FIG. 1 for cloud classification.

Figure 16:
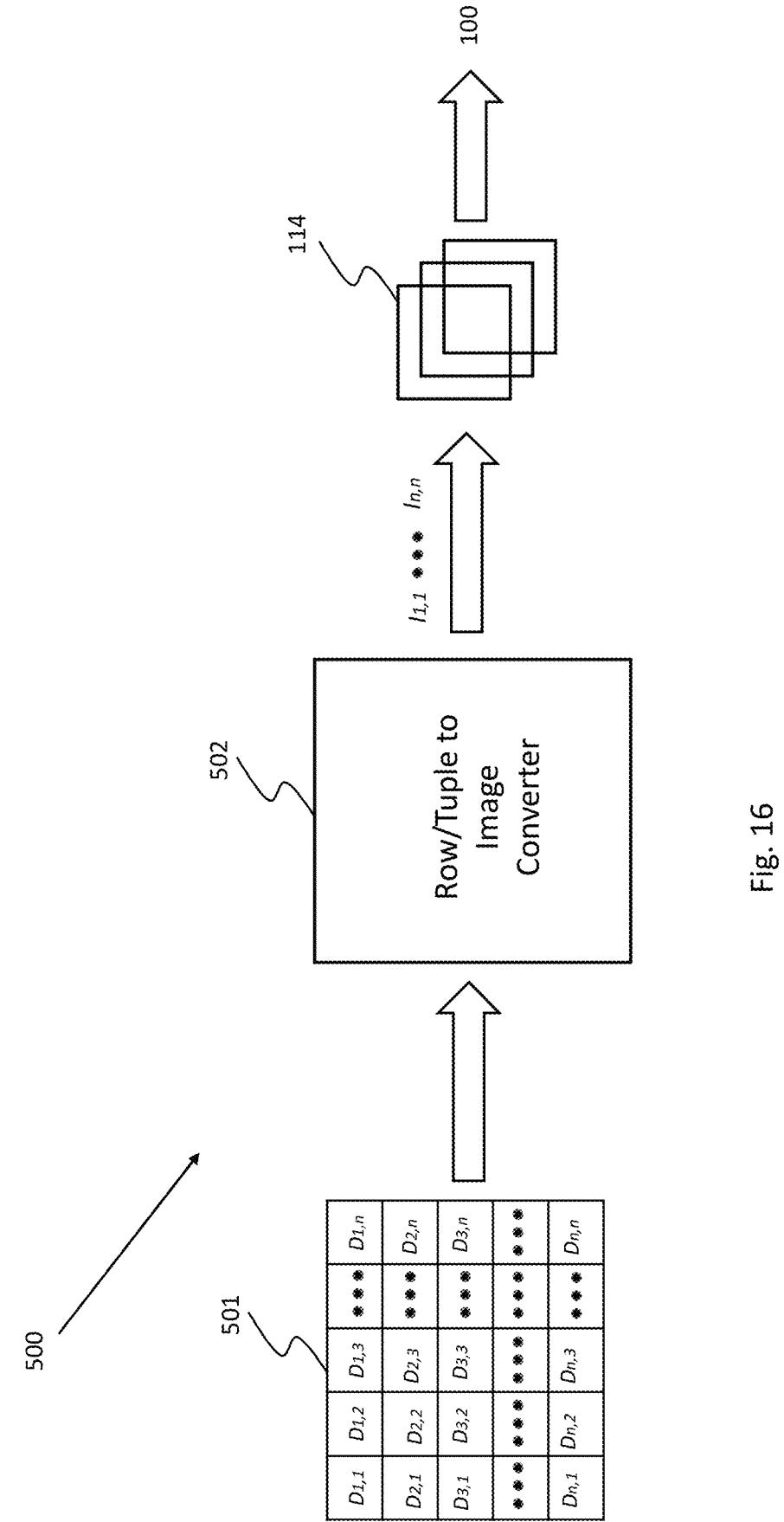
FIG. 16 illustrates in a block diagram form a structure of an add-on that can adapt the system of FIG. 1 to classify table-type documents.

FIG. 16 partially illustrates a procedure 500 for cloud classifying a table. Table 501 consisting of n×n data cells D1,1 . . . Dn,n is fed row by row (or tuple by tuple) into a row/tuple-to-image converter 502. Converter 502 issues $n^2$ images I1,1 . . . In,n (images 114). It should be noted that the use of a two-dimensional vector resulting in $n^2$ images is given herein as an example. Theoretically, any other dimension can be used, for example, a predefined H×W×D (height-width-depth) vector that issues $n^3$ images. Images 114 are then fed into the system 100 of FIG. 1. The procedure of FIG. 1 is then performed, resulting in classifications 113. When using system 100 for table classifications, the IIN 122 is pre-trained to classify each of a table's rows rather than images (as the system 100 of FIG. 1 was originally trained for).

In still another embodiment, Google cloud-based services and other cloud machine learning services also allow the classification of text documents. The inventive structure of the text-based classification system is similar to the case of images shown in FIG. 1. In the first stage, an encoder similar to encoder 101 forms an embedding of the original text, similar to embedding 102. The embedding is then "inflated" based on a deconvolution unit and key (similar to deconvolution unit 103 and key 104, respectively, and the "inflated" matrix is sent to the cloud for classification.

The cloud's classification is then returned and submitted, together with the embedding, to a pre-trained IIN similar to IIN 102 that issues the correct classification vector. Therefore, the process for classifying text documents is substantially identical to the case of images classifications shown in FIG. 1. When classifying text documents, a BERT encoder (mainly designed for text documents) or similar may be used at encoder 101.

There is a known problem in the field of machine learning, as follows: while it is a fact that the volume of documents by which a machine learning unit is trained highly affects the accuracy and classification scope of the unit, there are still cases in which a single organization does not have enough documents or computation capabilities to train its ML unit to the necessary requirements. Thus, cooperation between a plurality of n organizations $O_a$-$O_n$, all sharing their documents for the sole purpose of training the common ML unit, could have been very advantageous. However, this object cannot be achieved in the many cases where each organization wishes or must keep its documents fully confidential. The term "common system" does not intend to indicate that all organizations $O_a$-$O_n$ commonly own or operate the system. Instead, it intends to indicate that the system merges documents' knowledge submitted to it from all separate organizations $O_a$-$O_n$. Generally, the "common" system may be operated by a different organization that is foreign to all other organizations $O_a$-$O_n$.

Figure 3:
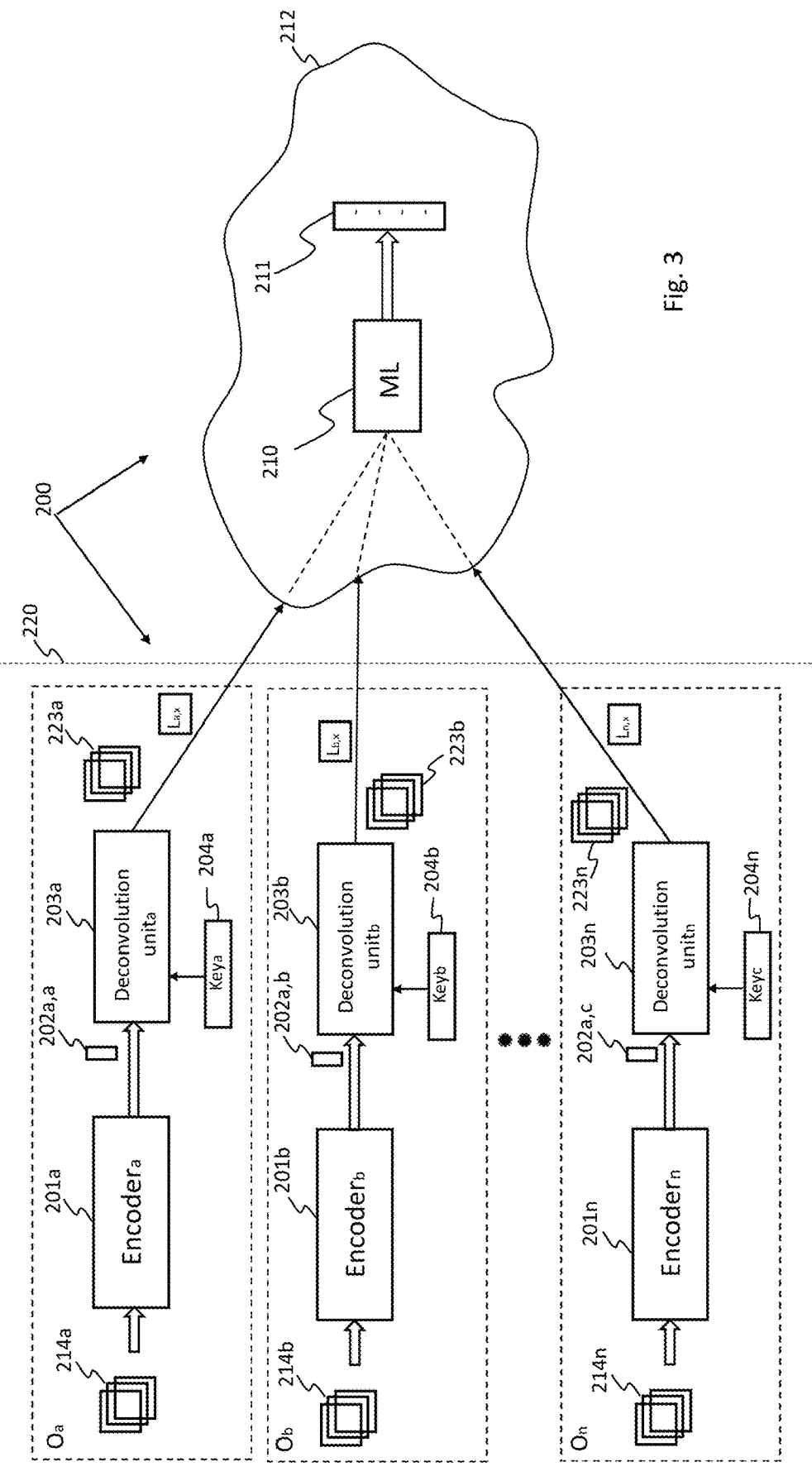
FIG. 3 illustrates in a block form a system 200 by which a plurality of organizations $O_a$-$O_n$ can train a common cloud machine learning system.

FIG. 3 illustrates in a block form a system 200 by which a plurality of organizations $O_a$-$O_n$ can train a common cloud machine learning system 212 by submitting documents to the common system while still keeping each organization's documents fully confidential both from the common service' operator and from the other organizations. Thus, the result of the training is a common system 212 trained by all the documents submitted to it from all the organizations while being able to separately classify newly submitted documents from each organization $O_a$-$O_n$ based on the organization's own defined classifications. Furthermore, as mentioned above, the confidentiality of each organization's documents is maintained during the training stage and during the run-time operation of the common system that follows (namely, when each organization submits its additional documents to the common system for classification).

Reference is again made to FIG. 3. The explanation follows for the organization $O_a$. The same explanation is similarly applicable to all other organizations $O_b$-$O_n$. First, a labeled document 214$_a$, designated for training by the common system 212, is submitted to the organization's encoder 201a. In similarity to the system of FIG. 1, encoder 201$_a$ creates an embedding 202$_{a,a}$ of document 201a, which is, in turn, conveyed into the deconvolution unit$_a$ (203a). Deconvolution unit, and its respective key$_a$ (204$_a$) are structurally built and function like the deconvolution unit 103 and respective key 104 of FIG. 1. Given the embedding at the input of the deconvolution unit$_a$, the deconvolution unit outputs a (scrambled) deconvolved image 223$_a$ which is submitted to the common system 212. Similarly, the same procedure repeats for all the other documents 214a such that they are all sequentially converted into (scrambled) deconvolved images and all sequentially submitted into the common system 212. Each scrambled document 223 is submitted to the common system together with its respective label/s $L_{x,x}$. The same procedure repeats in the internal system of all other organizations. For example, organization$_a$ may label its documents by classifications $class_1$,$class_2$ ($L_{a,x}$ in FIG. 3), where each of $class_1$,$class_2$ may have "true" or "false" value. There is no limit to the number of classifications that could be used by the invention. It should be noted that the labels themselves may be meaningless to an external entity. Moreover, different organizations may have a different number of labels (from now on, and for the sake of convenience, it is assumed that each organization has two classifications). As noted, the values of $class_1$,$class_2$ are submitted into the common system together with the scrambled document 223$_a$. Similarly, organization b may submit its scrambled images with classifications $class_3$,$class_4$ ($L_{n,x}$), and organization, submits its own documents with classifications $class_{2n-1}$,$class_2$, ($L_{n,x}$). Given each deconvolved document 223 and its respective classifications, the machine learning unit 210 in the cloud is trained. The procedure repeats for all the documents 223 of all the individual organizations. During the training, the cloud service operator receives scrambled images; therefore, it is not exposed to any document's content. Thus, each of the organizations $O_a$-$O_n$ is exposed only to its own documents, and the documents of the other organizations are concealed from it. Moreover, system 212 is trained by all the various documents of all the organizations $O_a$-$O_n$, forming a commonly trained system.

Upon completing the training, each organization separately operates a system like the system of FIG. 1 for submitting its own documents to the common system 212, in a scrambled manner, for labeling, as described. Common system 212 processes each document and returns a common classification vector 211 in the form shown in FIG. 4.

The IIN of each organization is pre-trained similarly as described before concerning the system of FIG. 1. Thus, following each submission of a scrambled image, and given each classification vector 211, the respective organization submits the received common vector 211 to its own IIN 122 (shown in FIG. 1) for conversion. As before, IIN 122 also receives the respective embedding 202a of the currently processed image. Given the common vector 211 and the embedding 202a, the IIN outputs the image's correct classification/s (label/s) 113 (FIG. 1).

As shown, each organization $O_a$-$O_n$ utilizes the common system to classify its own documents. The common system 112, in turn, is trained by documents from all the organizations $O_a$-$O_n$. However, full confidentiality is maintained between the organizations' systems and the common system 212, and between each organization and all others during the training and during run-time operation.

Experiments, Examples, Additional Embodiments, and Further Discussion

The main insight behind the encryption process is that convolutional (and deconvolutional) architectures identify and transform latent patterns in the data. These patterns are very difficult to reverse-engineer because of the non-linear nature of the neural networks' activation function and the many operations involved, but they are maintained nonetheless.

Furthermore, these transformations are performed in a consistent (yet complex) manner, and therefore they elicit consistent behavior from the cloud-based machine learning services (i.e., a classification vector).

Experiments Setup

The inventors have tested various aspects of the structure of FIG. 1. Four datasets were used in the experiments: a) two variants of ImageNet: ILSVRC2010 and ILSVRC2012; b) CIFAR-100, and; c) CIFAR-10.

The inventors also used the following pre-trained architectures as the CMLS: InceptionV3, Xception, and VGG16. The two former architectures were trained on the training set of ILSVRC2012 (i.e., ImageNet), and the latter both on CIFAR10 and CIFAR100.

For the Encoder component, the inventors used pre-trained architectures of ResNet50 and ResNet101, and ResNet50V2, which were trained on the training set of ILSVRC2012. The output of this component is an embedding vector with 2,048 entries. The same pre-trained architecture was not used simultaneously as the encoder and as the CMLS in the experiments (to eliminate the possibility that the images were somehow encoded in a particularly easy way for the cloud to classify).

For the deconvolution unit 103, the inventors used the DCGAN's generator. The dimensions of the output image were 256×256×3.

The IIN was a dense neural network with a single hidden layer, followed by a softmax layer. The input vector size was 2048+|V|, where V is the classification vector of the cloud. The inventors used applied batch normalization and dropout and used ADAM optimization. A learning rate of 0.0001 with exponential decay was used, and the network was trained up to 40 epochs, with early stopping.

The inventors evaluated the invention's approach using two metrics top-1 and top-5 accuracy that are the standard in image classification tasks. The inventors calculated these metrics for both the ground truth (i.e., true labels) and the cloud's classification of the unencrypted image (i.e., they measured the ability to infer the cloud's classifications).

All experiments in this section (i.e., training the INN) were conducted on a laptop with 16 GB RAM and an Intel CPU (Intel® Core™ i7-8565U).

Five use cases were evaluated as follows:

a. Same labels in confidential data and cloud—in this use-case, the cloud was trained on images with the same labels as confidential data (no overlap between the two sets of images);

b. A subset of cloud labels—the confidential data consists of a subset of the labels on which the cloud was trained—the goal of these experiments is to assess the impact of the relative number of labels on performance;

c. Different labels in confidential data and cloud—these experiments evaluated the system's ability to perform transfer learning to new labels;

d. Ensemble—The effects of using several Encoders were explored;

e. Varying IIN training set sizes—The performance as a function of the IIN's training set size.

Use-Case 1: Same Labels in Confidential Data and Cloud. Three sets of experiments were conducted for ImageNet, CIFAR100, and CIFAR10. FIG. 5 presents the pre-trained models used as the CMLS and the Encoder component in each experiment. For the ImageNet experiments, the inventors used 90% of the validation set, 45,000 images to train the INN, and used the remaining 10% (5,000 images) as the test set. For CIFAR10/100, 90% (9,000 images) of the test set were used to train the INN, and the remaining 10% for the evaluation. Five experiments were performed with each dataset, with random 90%/10% splits, and the report includes the averages of all runs.

The results of the inventors' evaluation are presented in FIG. 5. The INN's performance is presented with respect to the ground truth and to the CMLS's classifications of the unencrypted images. To place the results in context, the performance of the cloud model is presented on the unencrypted images. These results are, in effect, the upper bound for the performance of the invention's approach. The results clearly show the capability to infer both the ground truth labels and the cloud's classifications. There is, however, a decrease in performance. For the prediction of true labels, for example, the accuracy was reduced by 6.2%-9.8% for ImageNet, by 1.6%-5.2% for CIFAR100, and by 0.6%-6.8% for CIFAR10. An important observation is that while there is a decrease in performance, the decrease is smaller when the number of labels in the confidential data is small. The reason for this phenomenon is simple: as the ratio of labels in the confidential data and that of the cloud $|L_{conf}|/|L_{cloud}|$ becomes smaller, each confidential data label can be expressed in a more nuanced way. This additional "bandwidth" is helpful because this kind of scrambling approach results in much higher entropy in the CMLS's classification vector. The next use case focuses on further analysis of the effects of $|L_{conf}|/|L_{cloud}|$.

Use-Case 2: Using a subset of confidential data labels. Based on use-case 1, the inventors revisited their ImageNet experiments (in which they had the largest gap with the original cloud performance). The same settings were used as in use-case 1, but the confidential data contained only a subset of $^{10}/_{100}$ labels instead of the original 1,000. For each of these two settings, 10 and 100, five experiments were performed, with the labels of each randomly selected. The inventors used a 70%/30% train/test split with 50 images per label, resulting in $^{350}/_{3,500}$ images for the training of the IIN and $^{150}/_{1,500}$ images for evaluation.

The evaluation results are presented in FIG. 6. It becomes clear that the performance on ImageNet improves as the number of labels decreases, with the system's top-1 accuracy rising from 67.9% to 95.5%, and its top-5 accuracy rising from 87.6% to 99.9%. The improvement in performance shows that the hypothesis that $|L_{conf}|/|L_{cloud}|$ is the main factor in determining the method's performance is correct. $L_{conf}$ refers to the number of labels in the confidential data, $L_{cloud}$ indicates the number of labels in the cloud service 112.

Use-Case 3: Different labels for confidential data and cloud. The inventors evaluated the system's ability to infer labels that did not appear in the system's training set. This use case is important because it assesses whether the proposed approach is generic and transferable. For these experiments VGG16 that was trained on CIFAR 100 as our CMLS was used, and ResNet101, that was trained on ImageNet was used as the encoder.

To generate a confidential dataset, the inventors first identified all ImageNet labels that did not appear in CIFAR100. Next, the inventors randomly sampled 10 labels from these labels, 150 images per class, 1,500 overall. 70% of these images (1,050) were used to train the Internal Inference agent, and the remaining 30% were used for evaluation. This process was repeated five times, and the averaged results are presented in FIG. 7. For this setting, the inventors can only present the results with respect to the original image labels, which clearly show that it is possible to reach the same level of performance for images with previously unseen labels, in similarity to labels on which the CMLS was trained. In addition, the results show that the invention's approach is most effective when $|L_{conf}|/|L_{cloud}|$ is small.

Use-Case 4: Using an ensemble of Encoders. This use case aims to examine whether an ensemble of encoders can improve the performance of the invention's approach. Multiple pre-trained networks were used as the encoders. The resulting encodings were scrambled using the same deconvolution unit 103 and sent to the CMLS. The classification vectors produced for each individual encoding are then concatenated and fed as a single input to the IIN.

The analysis results are presented in FIG. 8. This use-case was based on the experiments presented in FIG. 5, therefore, the results for a single encoder are identical. When using two encoders, the added network was ResNet50. For the third encoder, the inventors used ResNet50v2 for the ImageNet dataset and ResNet101 for CIFAR100/10. The results show that adding encoders indeed improves the system's performance, although the improvement appears to be greater for the CIFAR10/CIFAR100 datasets. Using the paired-t test, the inventors could determine that the two-Encoders setting significantly outperforms the single-encoder setting with p<0.001, and that three-Encoders outperform the two-Encoders with a smaller but still highly significant value of p<0.01.

Use-Case 5: The Effect of the IIN's training size on performance. The effect of the training set size on the performance of the IIN was also analyzed. While larger training sets are expected to lead to higher accuracy, the goal was to quantify this impact. The analysis was conducted as follows: ILSVRC2012's was used as the validation set, from which 100 labels were randomly sampled to train the IIN and evaluate its performance. The inventors used InceptionV3 to simulate the CMLS (this model was trained on ILSVRC2012's training set) and ResNet50 as the encoder.

Figure 9:
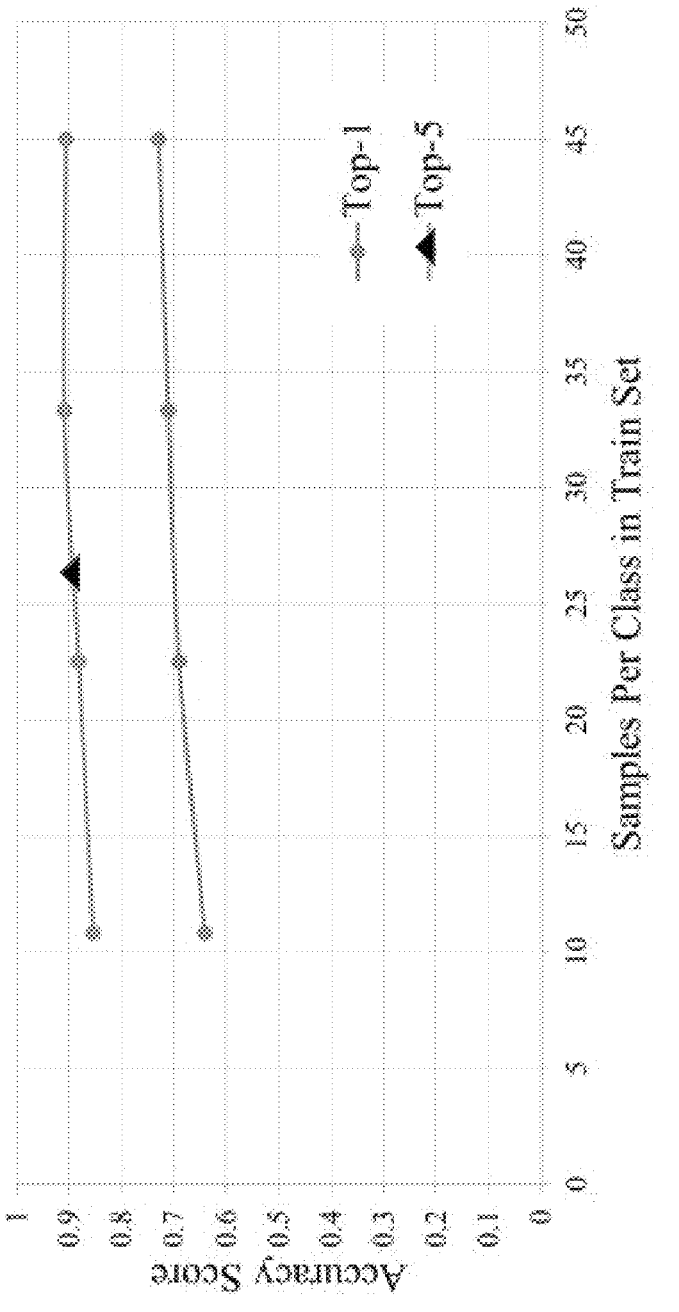
FIG. 9 shows experimental results in graphical form (the system's top-1 and top-5 accuracy) on a randomly sampled subset of ImageNet, consisting of 100 labels. The results are presented as a function of the number of images per label that were used in the system's training set.

Different numbers of images from each of the selected 100 labels were sampled and used to train the IIN. This experiment was repeated five times, and the average results were determined, as presented in FIG. 9. It becomes clear that an increase in the training set significantly improves the performance of our approach, with top-1 accuracy improving by 8.7% and top-5 accuracy improving by 5.2%. It is also clear that the improvement in the system's performance begins to plateau at around 35 images per label, which achieved an accuracy of 90.6% compared to the 91.2% for 45 images, indicating that a relatively small number of training samples is needed for maximal performance.

The small number of samples necessary to train our IIN is an advantage of the invention. Given that each key (i.e., the randomly-initialized generator weights) can only be used a limited number of times before an adversary may try to reconstruct the original images, requiring a limited number of images to train the IIN means that each key can be used for a longer period.

The inventors also analyzed four aspects of the proposed approach and demonstrated the difficulties an attacker would face when attempting to recover the original images. The inventors demonstrated that the system's scrambled images do not contain any information humans can understand. The inventors also analyzed the outputs produced by the CMLS for the images (i.e., the classification vectors) and showed that the former's entropy is much higher than that of unscrambled images and that the "true" label of the image (i.e., the ground truth) is almost never in the top-5 chosen labels. The inventors also analyzed the scrambled images and showed that they are more difficult to reconstruct than their plaintext counterparts when using the most common method for achieving this goal: an autoencoder (encoder 101 and deconvolution unit 103) architecture (for this task, the inventors assumed the unrealistic scenario where an attacker obtains some plaintext images and their scrambled counterparts). Finally, the inventors provided an empirical loose upper bound on the number of images that can be scrambled by using a single key.

First, the inventors addressed a simple question: can humans identify objects in the system's scrambled images? FIGS. 2a and 2b present an original image and its scrambled counterpart, respectively. It is evident that no information in the scrambled image is discernible to humans using the naked eye. Similar grayscale images were produced for all the images that were manually examined.

Another goal was to determine whether the invention's approach effectively obfuscates the labels of the scrambled images. The inventors used the InceptionV3 and ResNet50 architectures to simulate the CMLS and encoder models, respectively. The training and evaluation image sets were those of use-case 1.

Initially, the inventors compared the classification vectors produced by the CMLS for each image and its respective scrambled counterpart. The results, presented in FIG. 5, show that the probabilities of any intersection of labels in the top-1 and top-5 labels are 0.07% and 0.52%, respectively. Moreover, the confidence scores assigned for each of the original top-1 and top-5 labels have been reduced by an average of 76%-87%, respectively. Finally, an analysis of the entropy of the classification vectors of plaintext and confidential images shows that the entropy of the latter is more than twice that of the former: 4.3 to 1.97. These results indicate that the system's scrambled images are not only indiscernible to humans, but the CMLS's classification vector does not enable an easy inference of the original label(s) assigned to them.

Figure 10:
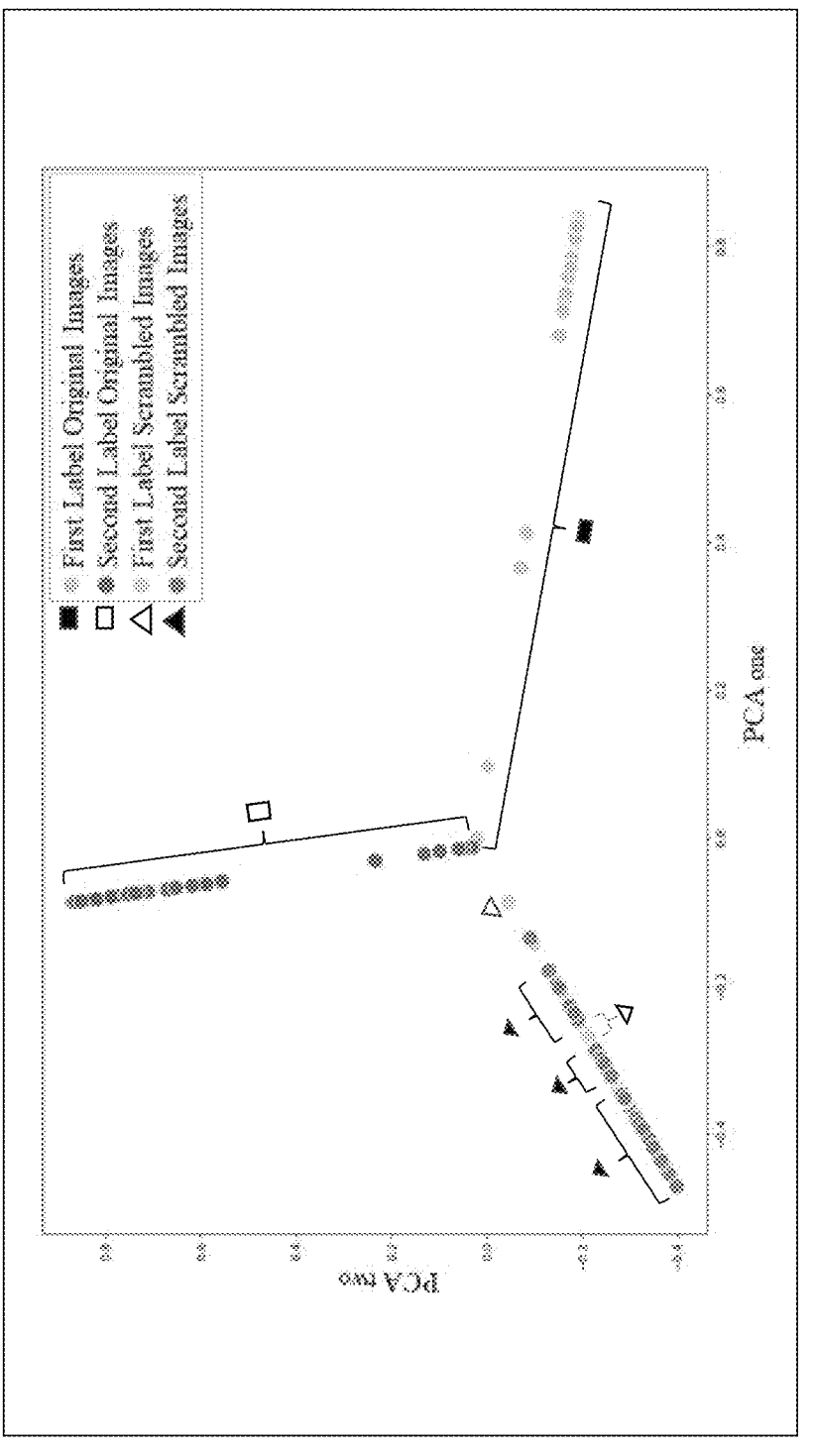
FIG. 10 shows generated 2D representations (The classification vectors of plaintext and scrambled images of two labels, presented in a 2D space. It is clear that plaintext images are clearly separated, while the scrambled ones are mixed together)

Next, the inventors used Principal Components Analysis (PCA) to reduce the dimensionality of the classification vectors of original and scrambled images. The inventors randomly chose two labels from ImageNet, each consisting of 50 samples. The generated 2D representations are presented in FIG. 10. It becomes clear that while the classification vectors for the two original groups of images are separated, all the scrambled images are grouped together. Additionally, the scrambled images' representation is clearly separated from both groups of original images. These results further show that the scrambling process effectively obfuscates the image's original label.

In the previous discussion above, the inventors showed that the system's scrambled images are not discernible by human beings and that they induce a higher degree of entropy in their classification. The inventors proceeded to determine whether the system's scrambled images are more difficult to reconstruct. The inventors used an autoencoder (encoder 101 and deconvolution unit 103) in two experimental settings: a) receive the original image as an input, and reconstruct it; b) receive the scrambled image as an input, and reconstruct the original image.

The inventors used as an autoencoder the well-known DCGAN architecture. The inventors also used DCGAN's discriminator, augmented with additional residual blocks, as the encoder. DCGAN's generator was also used as the decoder. For the system's setup, the inventors also used the InceptionV3 architecture as the cloud-based model and ResNet50 as the encoder.

For this experiment, the inventors randomly selected 100 labels from ImageNet, and then retrieved all 150 images associated with each label. The inventors, therefore, created a set of 15,000 images. The inventors then randomly divided these 15,000 images into train and test sets, using a 90%/10% split. This process was repeated twice, and their averaged results are presented in FIG. 11. To enable faster convergence (i.e., using fewer training samples), all images were reduced to a quarter of their original size (128×128 rather than 256×256).

Figures 12A, 12B:
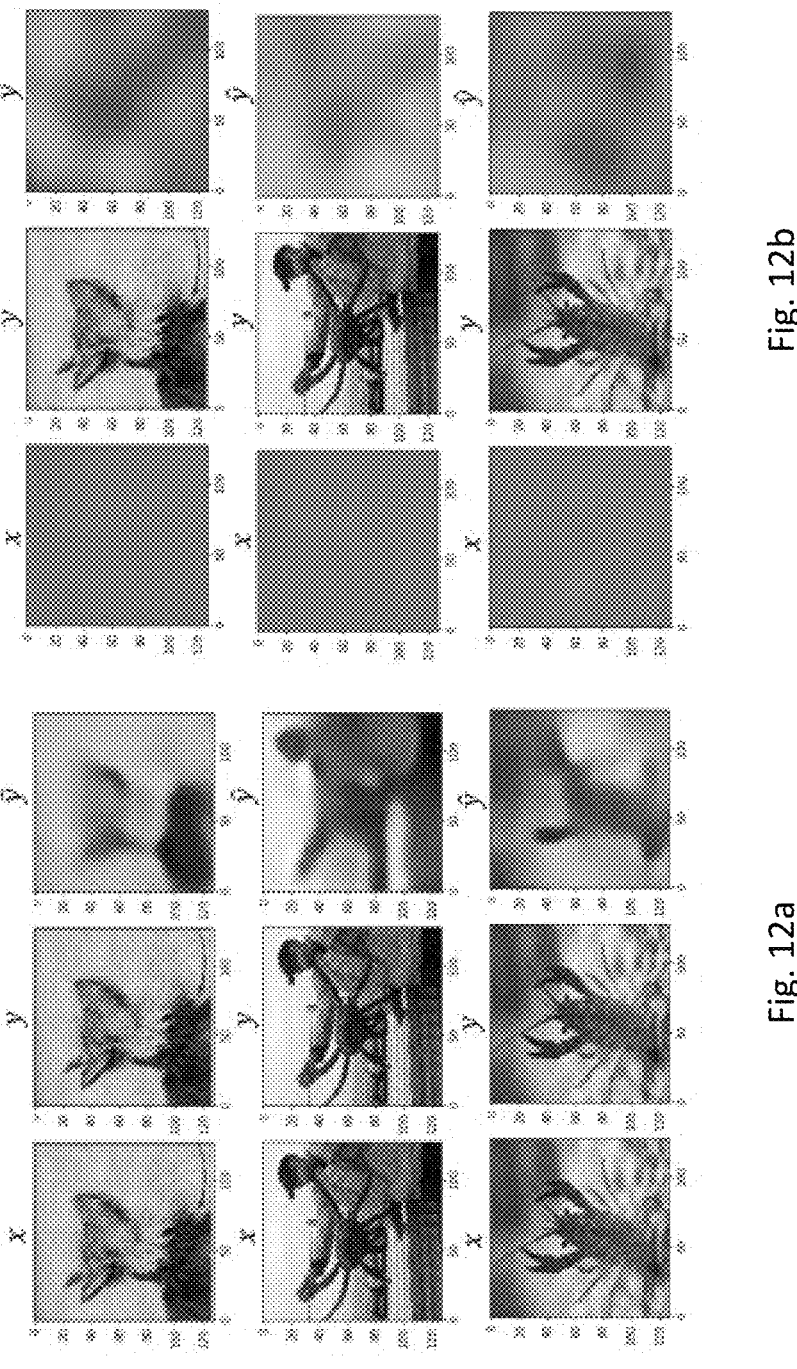
FIG. 12a shows additional experiments results (the inputs (x), targets (y), and reconstructions (yˆ) of images—the use-case where the plaintext image was received as input.
FIG. 12b shows additional experiments results (the use-case where scrambled images were received)

The inventors defined the difficulty of reconstructing as the number of samples necessary for the autoencoder training. This definition becomes significant hereinafter, where the inventors show an analysis of the system's robustness. The evaluation results are presented in FIGS. 11 and 12b. While this training set size is sufficient for a decent image reconstruction when applied to the original images, the reconstruction quality for scrambled images is so low that the images are incomprehensible. In FIG. 12a, original images x are submitted into the encoder of the invention (resulting in a respective embedding), and then the embedding is fed into a decoder trained to reconstruct x given the embedding. It can be seen that given training of, for example, 13,500 images, the decoder issues images y^ somewhat close to the original image. However, this is not the situation in the cloud system, which only has the deconvolved (scrambled) images—x in FIG. 12b. In FIG. 12b, the same structure was applied; however, given the scrambled images x as inputs. While the object is again to reconstruct images x of FIG. 12a (target y in FIGS. 12a and 12b, the results y^ of FIGS. 12b show that the reconstructions y^ are very far from the original images x, y in FIG. 12a, y in FIG. 12b.

As previously explained, only encrypted images ever leave the organizational network. As a result, attackers will likely have to resort to a practically infeasible brute-force search to discover our randomly-set generator (deconvolution unit 103) weights. Empirical proof for the robustness of the system of FIG. 1 is provided. First, the inventors created a scenario where the adversary has access to additional information that enables a more effective attack against the systems' approach. Then, the inventors used the amount of information required to carry out this attack as a limit on the number of images that each given key can securely scramble.

The proposed attack scenario: Assume that an adversary has gained access to pairs of original-scrambled images (i.e., not only does the adversary have access to such sets, but he can also pair them accordingly). The adversary can now train a neural architecture, more specifically, an autoencoder to reconstruct the original image from the encrypted one. This scenario, in fact, is exactly the setup described in the second experimental setting listed above, where the inventors showed that 13,500 original/scrambled image pairs are insufficient for any meaningful reconstruction of scrambled images. It is also important to note that, as shown in use-case 5, the maximal number of scrambled images needed to train the IIN is 4,500 (for confidential data with 100 labels).

The aforementioned statistics gave the inventors a limit on the number of images that can be safely scrambled without the danger of reconstruction by an adverse entity. Given that 13,500 image pairs are not enough to mount a successful attack and that 4,500 images are needed to train our IIN, the system can safely use any given key for 9,000 submissions to the cloud. When this number is reached, all the operator of the system needs is just to re-initialize the weights of the deconvolution unit 103 with a new key.

Finally, the inventors emphasize, as follows:

The figure of 13,500 is a very loose limit, created using an unrealistic scenario that greatly favors the adversary. Moreover, the autoencoders were trained on images whose size was only a quarter of the original, thus making the reconstruction process easier.

The process of generating a new key is instantaneous, and the training of the IIN consumes approximately five minutes on a laptop computer. Therefore, replacing the scrambling key has a negligible computational cost.

The invention's process can easily be made more secure by deploying multiple keys and IINs. Doing so will not only improve performance (see use-case 4), but their gradual replacement makes an adversarial attack even more difficult.

As noted above, One-time Pad Encryption (OPE) is known to be unbreakable. All the embodiments above disclose an OPE-like structure that is extremely hard to break. The present invention upgrades the structure of the above described systems to perform as a real OPE system.

Figure 17:
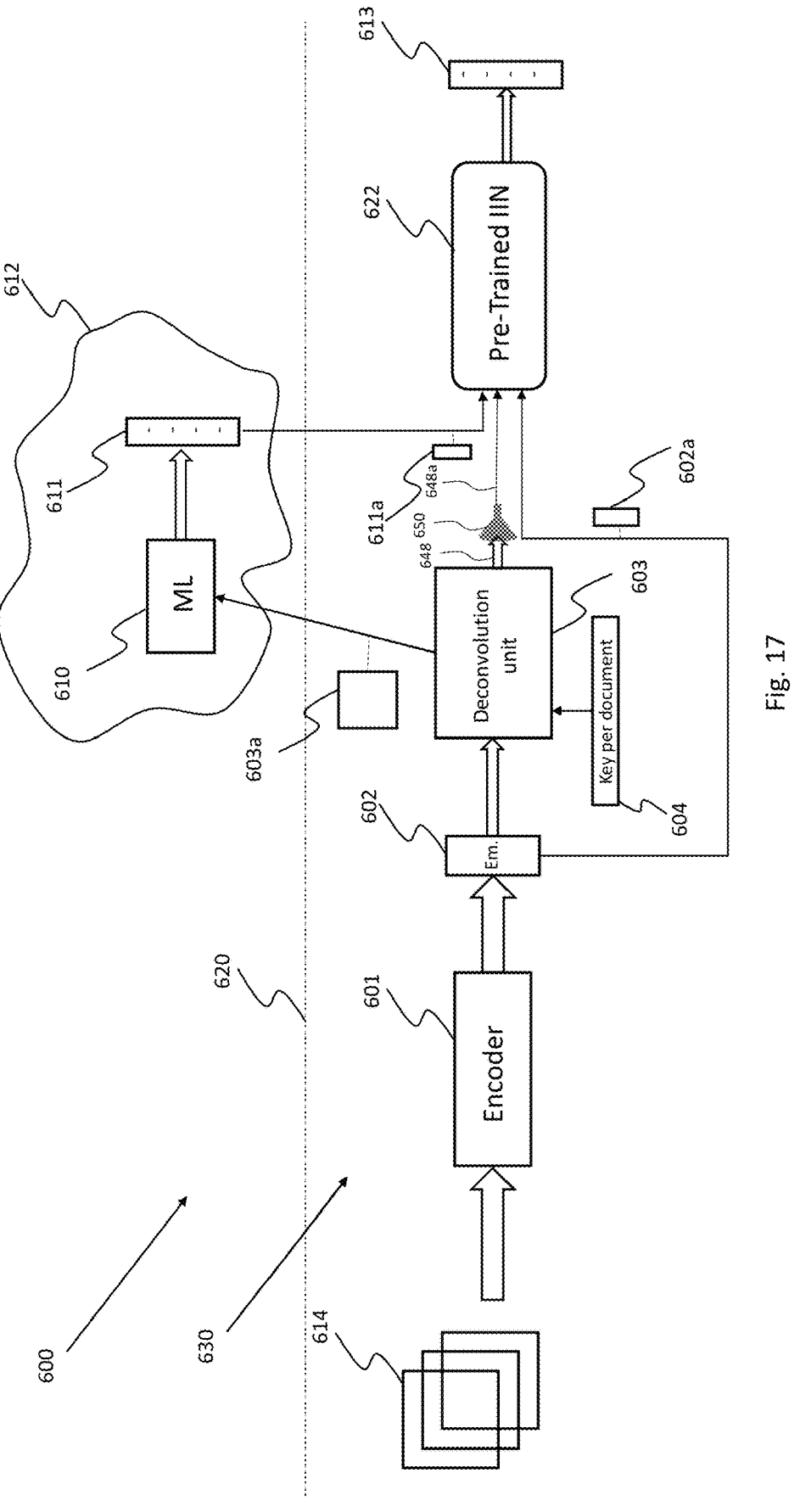
FIG. 17 shows a secured and private system 600 for receiving on-cloud machine learning services, having an OPE configuration, according to the present invention.

FIG. 17 shows a secured and private system 600 for receiving on-cloud machine learning services, having an OPE configuration, according to the present invention. System 600 is somewhat similar to the system of FIG. 1 (similar references in FIGS. 1 and 17 refer to components performing similar functionalities). System 600 differs from system 100 of FIG. 1 mainly in: (a) In system 100, the key 104 remains the same for a plurality of documents (for example, 6,000 documents), and any alteration of the key requires re-training of the pre-trained IIN 122. On the contrary, in system 600, the key-per-document 604 can be randomly replaced for each transmitted document 614, and there is no necessity for re-training of the pre-trained IIN 622 upon the key 604 replacement; (b) In system 100 the two inputs to the pre-trained IIN 122 are i. the embedding 102; and ii. the classification 111 from the cloud. To the contrary, the three inputs to the pre-trained IIN of system 600 of the present invention are: i. the embedding 602; ii. the classification 611 from the cloud; and iii. the activation vector 648 from the deconvolution unit 603 as compressed by second encoder 650 to form the compressed activation vector 648a.

FIG. 17 is now described in more detail. For example, an organization 630 located below the virtual line 620 needs classification of its documents 614 (in this specific embodiment, each document is an image). Given the superior machine-learning services offered by the cloud system 612, the organization wishes to utilize system 612 while maintaining secrecy and privacy by not exposing its documents to any external entity (schematically indicated above the secrecy line 620).

Each document 614, in the form of an n×n matrix, is separately fed into encoder 601; each matrix value represents a B/W or RGB pixel value (in the case of RGB, the document is typically represented by three respective matrices). Encoder 601 is a non-linear machine-learning unit that serially applies a plurality of pre-defined filters on the document (for example, performing convolution operations), resulting in an embedding representation 602 of the original document. Filtering, in general, and convolution, in particular, are well-known machine learning operations (see, for example, https://www.deeplearningbook.org/, chapter 9). The result of the filtering operations by encoder 601 is a reduced (embedding) representation matrix 602 of dimensions a×b of the original document 614, where dimensions a and b are smaller than n. Moreover, a 3-matrix RGB representation may be reduced in the embedding to a single-matrix representation. Embedding 602 is then fed into a deconvolution unit 603, another multi-stage non-linear machine-learning module that performs on embedding 602 a generally opposite operation relative to that of encoder 601. More specifically, while encoder 601 reduces the dimensions of matrix-image 614, the deconvolution unit 603 increases (i.e., "inflates") the dimensions of embedding 602 to form a matrix 603a with dimensions c×d, where each of c and d is relatively close (or the same) as each original dimension n. In some cases, c may equal d; however, this is not a requirement. Furthermore, while the original image matrix 614 is preferably square, this is also not a requirement.

Various commercially available pre-trained encoders capable of creating embeddings of images may be used, such as VGG-16, VGG-19, multiple ResNet architectures, Xception, etc. Similarly, the deconvolution unit throughout the various embodiments of the invention may be replaced by a variety of neural networks, such as recurrent neurla, dense networks, etc.

The deconvolution unit 603 is a multi-layer neural network, where each of the network's neurons has its unique weight. According to the invention, each neuron's weight depends on secret key-per-document 604 (which is randomly altered between every two documents processed by system 600). For example, key 604 may include millions of different weights; however, there is no limitation to the number of weights that may be used. Therefore, deconvolution unit 603 creates an image 603a, for example, with relatively similar dimensions to those of the original image 614. There is no limitation to the size of image 603a in terms of pixels (from now on, for convenience, it is assumed that image 603a has the same dimensions as image 614). The deconvolved image 603a, however, includes gibberish values compared to those of the original image-matrix 614, given the non-linear and substantially random effect of the deconvolution. Although these gibberish values "scramble" the image, some features of embedding matrix 602 and of the original image matrix 614 remain within the deconvolved image 603a.

As noted, deconvolution unit 603 typically (but not necessarily) increases the embedding matrix by several size orders. The fact that the neurons' weights within the deconvolution unit 603 are randomly replaced for each document (given the fact that key 604 is randomly created for each document 614 processed by system 600) forms a one-time pad encryption (OPE) that prevents any way to decrypt the image at the cloud (the upper side of line 620) and restore image 614, given only the deconvolved image 603a.

Cloud machine learning (ML) service 610 is a mass-trained classification system, for example, Google's Auto Machine Learning services such as Vertex AI (https://cloud.google.com/vertex-ai), etc. ML system 610 is pre-trained (in this case by billions of images) to output a respective classification (or label) for each inputted image. For example, when system 610 receives image 614 of FIG. 2a, it is trained to output one or both of the labels "turtle" or "animal".

However, the ML machine 610 is fed by a scrambled image 603a (such as the one shown in FIG. 2b) rather than the original image 614 (such as in FIG. 2a). While image 603a looks entirely scrambled, it still possesses features from the embedded image 602 and the original image 614. ML 610 processes each scrambled image 603a in a typical manner, resulting in some classification vector 611. However, given the "scrambling" that image 603a was subjected to (by encoder 601 and deconvolution unit 603), the resulting classification vector 611 differs from the expected classification vector should the original image 614 be submitted to the ML machine 610 instead.

The determined classification vector 611 is conveyed to the organization's system 630 and submitted as vector 611a into an internal inference network (IIN) 622. IIN 622 is a machine learning unit that is pre-trained to convert each "deconvolved image" classification vector 611a ("deconvolved image" classification vector is defined as a classification vector issued by ML 610 for a deconvolved inputted image 603a) to a respective correct classification vector 613 given (a) each specific embedding 602 (or 602a, which is the same), (b) respective cloud deconvolved image classification vector 611a, and (c) the compressed activations vector 648a received from the deconvolution unit 603 (where the key is randomly alternated for each processed document 614). In contrast to the run-time operation stage where (a), (b), and (c) are used, during the training stage, the (d), namely, the known label for each image 614 is also used to train the IIN. IIN 622 is trained to issue the correct classification vector for each respective image 614. Correct vector 613 is the classification vector that the cloud system 612 would have issued should the original image 614 have been submitted to it rather than the deconvolved image 603a.

Given the facts that (a) the key-per document 604 is randomly replaced for each processed document 614 during the training phase of pre-trained IIN 622; and (b) that pre-trained IIN receives during the training the (compressed) activation vector 648a, the embedding 602a, and respective classification vectors 611a (in addition to labels that are provided only during the training stage), the pre-trained IIN 622 can be trained only one time. Following the single training session, the pre-trained IIN 622 can appropriately operate in run-time, even when the key 604 is randomly replaced for each submitted document 614. The IIN 622 is the only unit within the organization's system 630 that is trained (encoder 601 may be an off-the-shelf product). The training of the IIN 622 is relatively simple and may require a few thousand images.

The deconvolution unit 603 includes several layers (for example, between 3-100). Each layer includes a plurality of neurons (for example, between 50-200, but there are no limitations to the number of neurons). Each neuron has a plurality of inputs (fed from a previous stage) but only one output. The activations' vector is a vector that combines, for each embedding 602 of a given document 614 and key 604, all the neurons' outputs of deconvolution unit 603. For example, if deconvolution unit 603 has 4 layers of neurons, and each layer includes 100 neurons, the activations vector 648 has dimensions of 1×400 parameters. Second encoder 650 compresses vector 648 to a compressed vector 648a having dimensions, for example, of 1×2048 (but this is not a rigid requirement). Other levels or forms of compressions may apply. In one example, the compressed activations vector 648a may have dimensions in the range between 1×1000 to 1×64,000 (considering the fact that there are potentially millions of activations to process. As noted, the compressed activations vector 648a is one of the inputs to the pre-trained IIN 622.

To train the IIN 622 securely, organization 630 requires a relatively small dataset D of correctly labeled images. During the training, images D are encoded (by encoder 601) to form respective embeddings, scrambled (by deconvolution unit 603), and sent to the cloud. The cloud service 612 issues a deconvolved-image classification vector 611a, respectively, for each scrambled image from dataset D. The deconvolved-image classification vectors are sent back to organization 630. Then, the embedding 602 of each image (i.e., the output of encoder 601), the respective deconvolved-image classification vector 611, the compressed activations vector 648a are used to train the IIN to predict (during run-time) the correct label of the original image, based on the respective embedding and deconvolved-image classification vectors. The requirement from the organization to have a small labeled dataset of images for the training is reasonable since most organizations have proprietary knowledge they wish to protect; therefore, they can leverage these images for the training of IIN 622. If such a dataset is unavailable, the organization may use publicly available images for the training.

As noted, one-time pad encryption (OPE) is known to be unbreakable. System 600 is an OPE system, given that the secret key per document 640 is randomly modified for each specific processed image 614.

Figure 18:
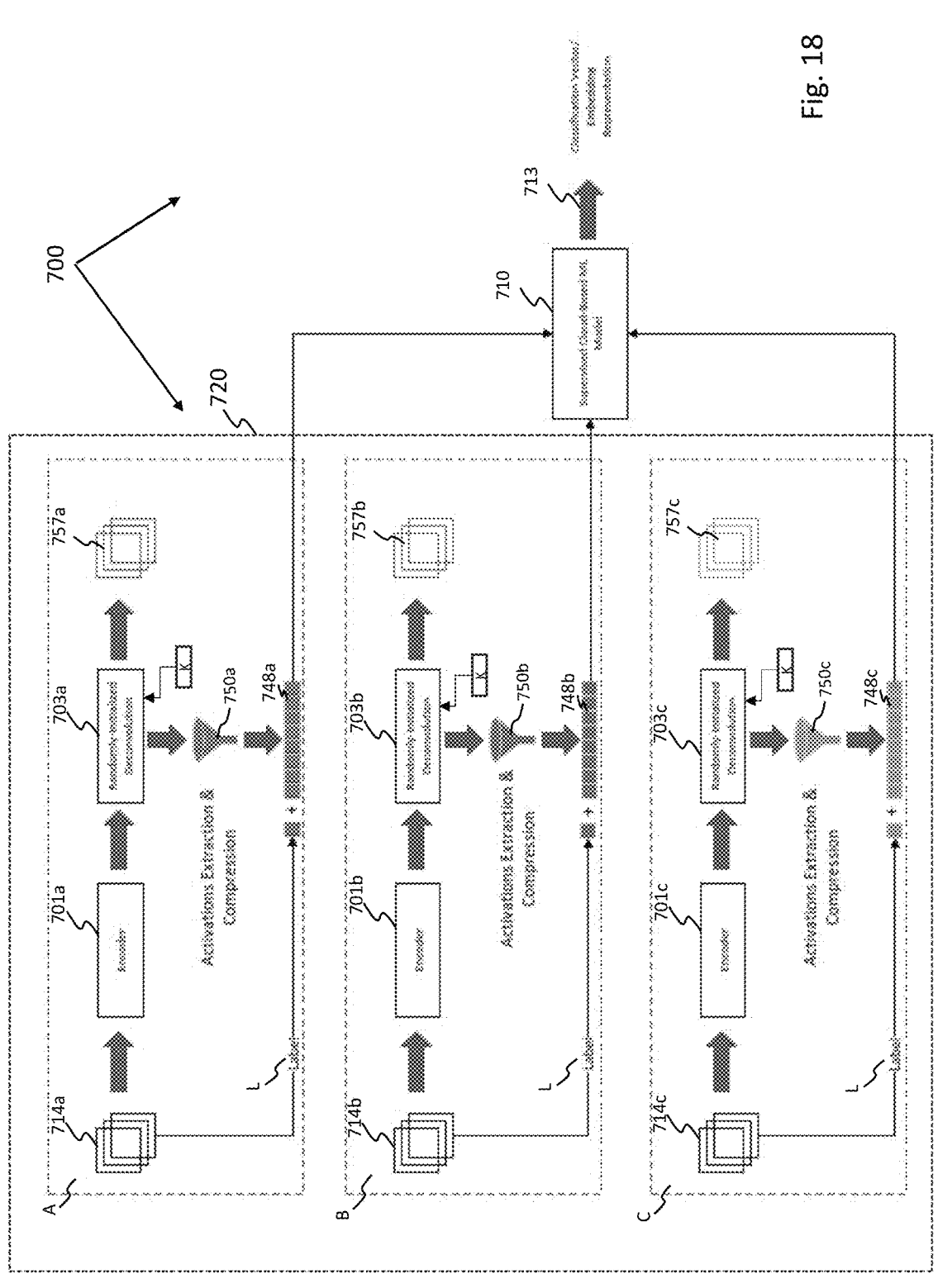
FIG. 18 illustrates in a block form how a system of the invention by which a plurality of organizations A-C can train a common cloud machine learning model by submitting the activations to the common model, while still keeping each organization's documents fully confidential both from the common service's operator and from the other organizations.

FIG. 18 illustrates in a block form how a system 700 by which a plurality of organizations A-C can train a common cloud machine learning model 710 by submitting the activations 748 to the common model, while still keeping each organization's documents fully confidential both from the common service' 710's operator and from the other organizations. The system is similar to the system of FIG. 3 (and partially to the system of FIG. 17), and similar indications describe elements of similar functionalities. The result of the training is a common cloud-based machine learning model 710, which is trained by all the activations 748. The activations 748 result, respectively, from the various documents 714 submitted (separately in each organization) to the encoder 701 and deconvolution unit 703 (in a manner as described for FIG. 17). In contrast to the system of FIG. 3, in the system 700 the key K is randomly changed for each submitted document. During the training, and separately for each document, the common supervised machine learning model 710 receives the pair consisting of respective label L and the condensed activations vector 748. The encrypted documents 757 remain within the organization during the training and the run-time phases.

Following the supervised training phase, the cloud-based model 710 is ready to classify the documents. Each submitted document goes through the respective encoder 701 and the deconvolution unit 703 (in which the key K is randomly replaced for each submitted document). The activations that are created during the process within the deconvolution unit 703 are compressed by the second encoder 750, forming a compressed vector 748. The compressed vector 748 is submitted to the cloud-based model 710, which, in turn, issues the classification 713 of the document. Classification 713 is returned to the respective organization A-C. Again, none of the documents 714 or the encrypted documents 757 ever leave the organization. System 700, similar to system 600 of FIG. 17, is an OPE system, as the key K is randomly replaced for each document. The common model 710 is the only model used by organizations A-C, and there is no necessity for using IINs within the organizations, as is needed by the system of FIG. 3.

Figure 19:
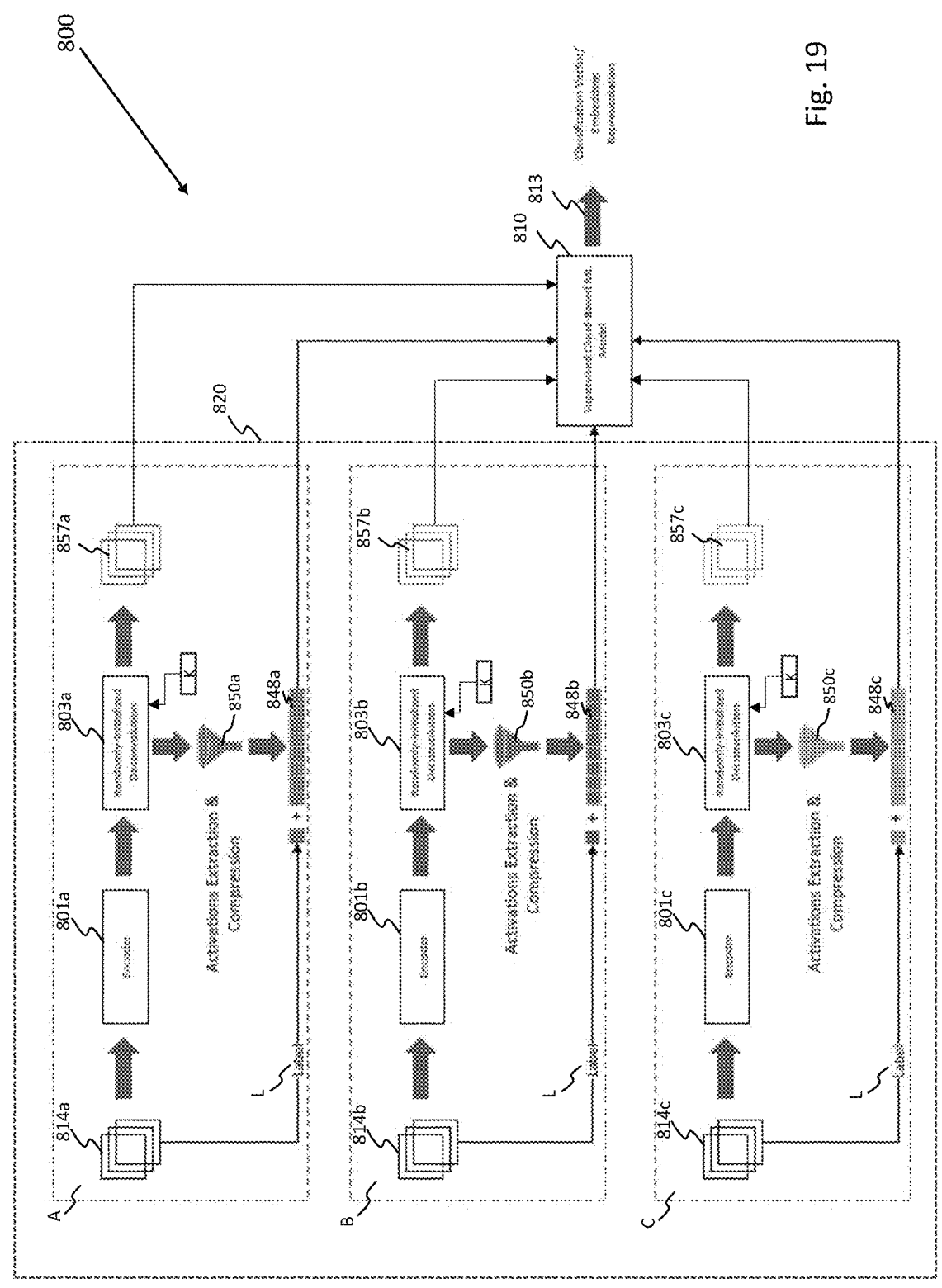
FIG. 19 illustrates a variant of the system of FIG. 18.

FIG. 19 illustrates a system 800 similar to system 700 of FIG. 18 (similar indications relate to elements performing similar functionalities). There are two differences between system 700 and system 800, as follows:

a. During the training phase, the common model 710 of system 700 is trained by both the activation vector 748 and the respective document label L. In contrast, the common model 810 of system 800 is trained by: (i) the activations vectors 748; (ii) the respective document labels L; and (iii) the respective encrypted documents 757.

b. During run-time, and for each document, the common model 710 of system 700 receives only the activation vector 748. In contrast, the common model 810 of system 800 receives (i) the activations vectors 748; and (ii) the respective encrypted documents 757.

c. The supervised models 710 and 810 of systems 700 and 800, respectively output the classification of the respective document 714 or 814, respectively.

While system 800 is expected to perform better (i.e., more accurately) than system 700, it may be somewhat less secure, given that the encrypted document 757 also leaves the organization.

Figure 20:
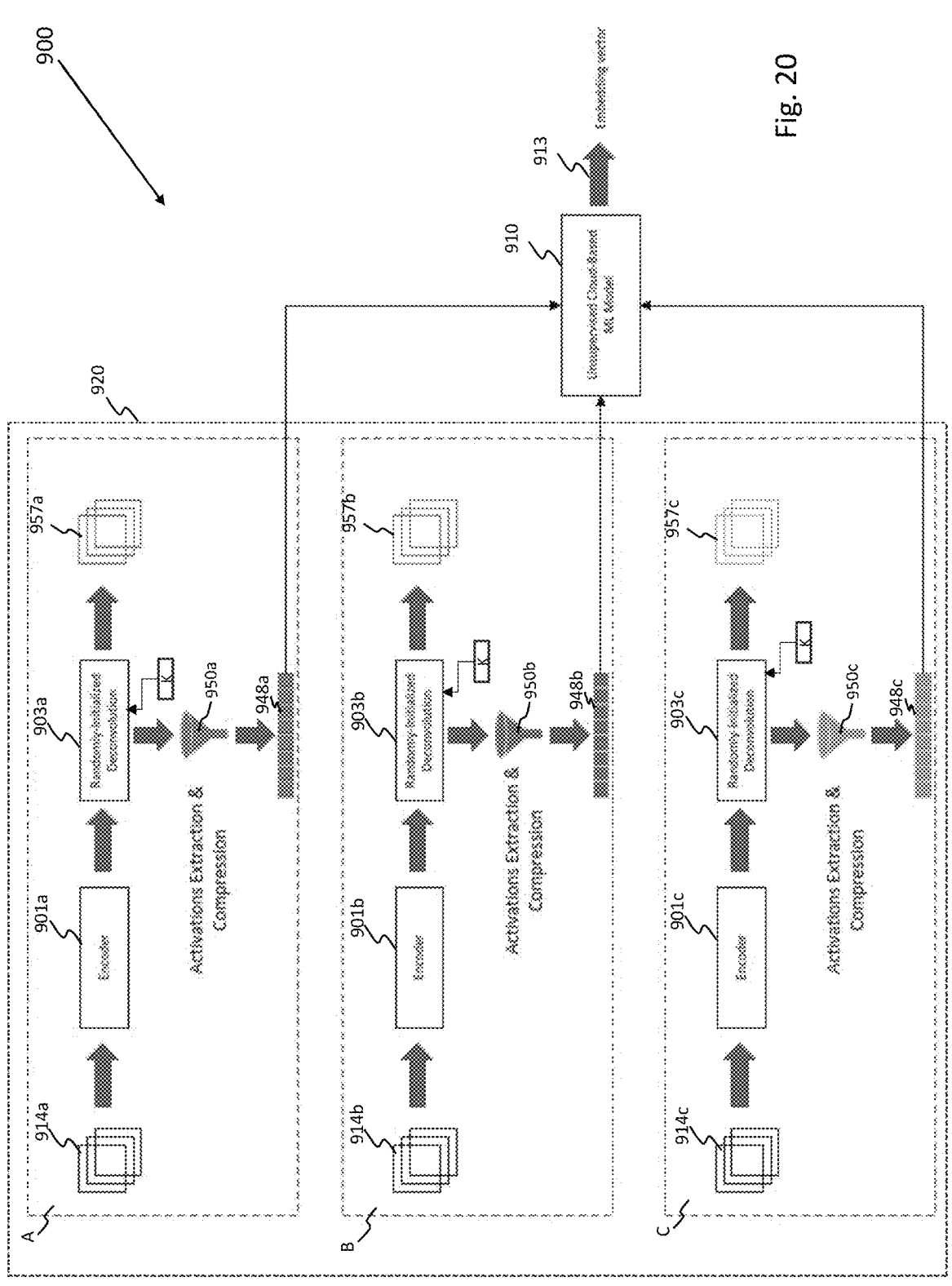
FIG. 20 illustrates in a block form how a system by which a plurality of organizations A-C can train a common cloud unsupervised machine learning model by submitting the activations to the common model, while still keeping each organization's documents fully confidential both from the common service's operator and from the other organizations.

FIG. 20 illustrates in a block form how a system 900 by which a plurality of organizations A-C can train a common cloud unsupervised machine learning model 910 by submitting the activations 948 to the common model, while still keeping each organization's documents fully confidential both from the common service' 810's operator and from the other organizations. The system is similar to the system of FIG. 18, and similar indications describe elements of similar functionalities. The result of the training is a common cloud-based machine learning model 910, which is trained in an unsupervised manner by all the activations 948. The activations 948 result, respectively, from the various documents 914 submitted (separately in each organization) to the encoder 901 and deconvolution unit 903 (in a manner as described for FIG. 17). In similarity to system 700, the key K is randomly changed for each submitted document. During the training, and separately for each document, the common unsupervised machine learning model 910 receives the compressed activations vector 948. The encrypted documents 757 remain within the organization during the training, and no document labels arrive at model 910.

Following the unsupervised training phase, the cloud-based model 910 is ready to issue, during run-time, for each activations vector 948 a further compressed (embedding) vector 913. The trained model 910 can replace the second encoder 650 of system 600 (FIG. 17). The fact that model 910 is trained, (compared to the untrained second encoder 650), improves the inputs to the IIN 662 of system 600, and further improves the accuracy of performance of the IIN 622 and of the entire system 600.

The systems of FIGS. 17-20 described above, that utilizes a key which is randomly generated for each document, and the activations created during the passage of the document through the deconvolution unit, are applicable for various types of documents, such as images, text, and tables, within all the embodiments, mutatis mutandis as also described above.

EXAMPLE

The inventors replicated the test described above, this time with the structure of FIG. 17—with a key modified for each document and using the activation vectors, as described. The observed results were even better than those observed in the original test.

While some embodiments of the invention have been described by way of illustration, it will be apparent that the invention can be carried into practice with many modifications, variations, and adaptations, and with the use of numerous equivalent or alternative solutions that are within the scope of persons skilled in the art, without departing from the spirit of the invention or exceeding the scope of the claims.

The invention claimed is:

1. An organization's system configured to label a given document based on an on-cloud classification service, while maintaining confidentiality of the given document's content from all entities external to the organization, comprising:
   a. an encoder configured to receive said given document, and to create an embedding of the given document;
   b. a deconvolution unit having a neural network, wherein weights of neurons within the neural network are defined relative to a key, said deconvolution unit being configured to receive said embedding, deconvolve the embedding, thereby to create a scrambled document which is then sent to the on-cloud classification service; and
   c. a pre-trained internal inference network, configured to:
      (i) receive from said on-cloud classification service a cloud-classification of said scrambled document; (ii) also receive a copy of said embedding; and (iii) identify, given said received cloud-classification and said embedding copy, said label of said given document.

2. The system of claim 1, wherein said embedding is a reduced size of said given document, and wherein said scrambled document is of increased size compared to said embedding.

3. The system of claim 1, wherein a type of said given document is selected from text, table, and image.

4. The system of claim 1, wherein the internal inference network is a machine-learning network that is trained by: (i) a plurality of documents and respective true labels, and (ii) a plurality of respective cloud classifications resulting from submission each of the plurality of said documents, respectively, to a portion of the system that includes said encoder, said deconvolution unit, and said cloud classification service.

5. The system of claim 1, wherein said key is periodically altered, and wherein said internal inference network is re-trained upon each key alteration.

6. The system of claim 1, particularly adapted for labeling a text document, wherein:
   said text document is separated into a plurality of sentences;
   each sentence is inserted separately into said encoder as a given document; and
   said pre-trained internal inference network identifies a true label of each said sentences, respectively.

7. The system of claim 1, particularly adapted for labeling a given table-type document, wherein:
   said encoder has the form of a row/tuple to image converter;
   said encoder receives at its input separately each row of said given table-type document; and
   said pre-trained internal inference network identifies a true label of each said rows, respectively.

8. The system of claim 1, wherein:
   additional documents, whose labels are known, respectively, are fed into said encoder, in addition to said given document;
   a concatenation unit is used to concatenate distinct embeddings created by the encoder for said given document and said additional documents, thereby forming a combined vector V;
   said combined vector V is fed into said deconvolution unit; and said pre-trained internal inference network is further configured to: (i) receive, in addition to the copy of said embedding, a label of each said additional documents; and (ii) identify said true label of said given document based on the labels of each said additional documents, in addition to said received cloud-classification, and said embedding copy.

9. A method enabling an organization to label a given document based on an on-cloud classification service, while maintaining confidentiality of the given document's content from all entities external to the organization, comprising:
   a. encoding said given document, resulting in an embedding of the given document;
   b. deconvolving said embedding by use of a deconvolution unit comprising a neural network, wherein weights of neurons within the neural network are defined relative to a key, thereby to create a scrambled document, and sending the scrambled document to the on-cloud classification service;
   c. using a pre-trained internal inference network to: (a) receive from said on-cloud service a cloud-classification of said scrambled document, (b) to also receive a copy of said embedding, and (c) to identify, given said received cloud-classification and said embedding copy, a true label of said given document.

10. The method of claim 9, wherein said embedding is a reduced size of said document, and wherein said scrambled document is of increased size compared to said embedding.

11. The method of claim 9, wherein a type of said given document is selected from text, table, and image.

12. The method of claim 9, wherein the internal inference network is a machine-learning network that is trained by (i) a plurality of documents and respective true labels, and (ii) a plurality of cloud classifications resulting from said encoding, deconvolution, and transfer of same documents, respectively, through said cloud classification service.

13. The method of claim 9, further comprising periodically altering said key, and further re-training said internal inference network upon each key alteration.

14. A multi-organization system for commonly training a common on-cloud classification service by labeled given documents submitted from all organizations, while maintaining confidentiality of the documents' contents of each organization from all entities external to that organization, comprising:
   a training sub-system in each organization comprising:
   a. an encoder configured to receive a given document, and to create an embedding of the given document;
   b. a deconvolution unit having a neural network, wherein weights of neurons within the neural network are defined relative to a key, said deconvolution unit being configured to receive said embedding, deconvolve the embedding, thereby to create a scrambled document which is then sent for training to the common on-cloud classification service, together with the respective label of that given document.

15. The multi-organization system of claim 14, wherein upon completion of the common training by labeled documents from all organizations, said common on-cloud classification service is ready to provide confidential documents classification to each said organizations.

16. The multi-organization system of claim 14, wherein during real-time labeling of new documents, each organization's sub-system comprising:
   a. an encoder configured to receive a new un-labeled document, and to create an embedding of the new document;

b. a deconvolution unit having a neural network, wherein weights of neurons within the neural network are defined relative to a key, said deconvolution unit being configured to receive said embedding, deconvolve the embedding, thereby to create a scrambled document which is then sent to the on-cloud classification service;

c. a pre-trained internal inference network, configured to: (a) receive from said on-cloud service a common cloud-classification vector of said scrambled document, (b) to also receive a copy of said embedding, and (c) to identify, given said received common cloud-classification vector and said embedding copy, a true label of said un-labeled document.

17. The system of claim 14, wherein said embedding is a reduced size of said new document, and wherein said scrambled image is of increased size compared to said embedding.

18. The system of claim 14, wherein a type of said document is selected from text, table, and image.

19. The system of claim 16, wherein the internal inference network of each organization is a machine-learning network that is trained by a plurality of documents and respective true labels, and a plurality of respective common cloud classification vectors resulting from said encoding, deconvolution, and submission to the common cloud classification service.

20. The system of claim 14, wherein said key in each organization is periodically altered, and each organization's internal inference network is re-trained upon each key alteration.

21. An organization's system configured to label a given document based on an on-cloud classification service, while maintaining confidentiality of the given document's content from all entities external to the organization, comprising:

a. a first encoder configured to receive said given document, and to create an embedding of the given document;

b. a deconvolution unit having a neural network, wherein weights of neurons within the neural network are defined relative to a key, said deconvolution unit being configured to receive said embedding, deconvolve the embedding, thereby to create a scrambled document which is then sent to the on-cloud classification service;

c. a pre-trained internal inference network, configured to: (a) receive from said on-cloud service a cloud-classification of said scrambled document, (b) to also receive a copy of said embedding, (c) to also receive activations vector reflecting activations created at the deconvolution unit during transfer of the embedding through it, and (d) to identify, given said received cloud-classification, said embedding copy, and said activations vector, a true label of said given document; wherein said key is a unique key which is randomly generated for each document.

22. The system of claim 21, wherein said activations vector is a vector compressed relative to the entire activations created during the passage of the embedding through the deconvolution unit, and wherein said compression is performed by a second encoder.

23. The system of claim 22, wherein said second encoder is a trained or untrained encoder.

24. The system of claim 21, wherein said embedding is a reduced size of said given document, and wherein said scrambled document is of increased size compared to said embedding.

25. The system of claim 21, wherein a type of said given document is selected from text, table, and image.

26. The system of claim 21, wherein the internal inference network is a machine-learning network that is trained by: (i) a plurality of documents embeddings and respective true labels, (ii) said activations vectors, respectively, and (iii) a plurality of respective cloud classifications resulting from submission each of the plurality of said documents, respectively, to a portion of the system that includes said first encoder, said deconvolution unit, and said cloud classification service.

27. The system of claim 21, particularly adapted for labeling a text document, wherein:

said text document is separated into a plurality of sentences;

each sentence is inserted separately into said first encoder as a given document; and said pre-trained internal inference network identifies a true label of each said sentences, respectively.

28. The system of claim 21, particularly adapted for labeling a given table-type document, wherein:

said first encoder has the form of a row/tuple to image converter;

said first encoder receives at its input separately each row of said given table-type document; and said pre-trained internal inference network identifies a true label of each said rows, respectively.

29. The system of claim 21, wherein:

additional documents, whose labels are known, respectively, are fed into said first encoder, in addition to said given document;

a concatenation unit is used to concatenate distinct embeddings created by the first encoder for said given document and said additional documents, thereby forming a combined vector V;

said combined vector V is fed into said deconvolution unit; and said pre-trained internal inference network is configured to: (a) receive from said on-cloud service a cloud-classification of said scrambled document, (b) to also receive a copy of said embedding, and a label of each said additional documents; and (c) to identify a true label of said given document based on said received cloud-classification, the labels of each said additional documents, and said embedding copy.

30. A method enabling an organization to label a given document based on an on-cloud classification service, while maintaining confidentiality of the given document's content from all entities external to the organization, comprising:

a. encoding said given document, resulting in an embedding of the given document;

b. deconvolving said embedding by use of a deconvolution unit comprising a neural network, wherein weights of neurons within the neural network are defined relative to a key, thereby to create a scrambled document, and sending the scrambled document to the on-cloud classification service; and c. using a pre-trained internal inference network to: (a) receive from said on-cloud service a cloud-classification of said scrambled document, (b) to also receive a copy of said embedding, (c) to also receive activations vector reflecting activations created at the deconvolution unit during transfer of the embedding through it, and (d) to identify, given said received cloud-classification, said embedding copy, and said activations vector, a true label of said given document; wherein said key is a unique key which is randomly generated for each document.

31. The method of claim 30, wherein said activations vector is a vector compressed relative to the entire activations created during the passage of the embedding through the deconvolution unit, and wherein said compression is performed by a second encoder.

32. The method of claim 30, wherein said embedding is a reduced size of said document, and wherein said scrambled document is of increased size compared to said embedding.

33. The method of claim 30, wherein a type of said given document is selected from text, table, and image.

34. The method of claim 30, wherein the internal inference network is a machine-learning network that is trained by (i) a plurality of documents and respective true labels, and (ii) a plurality of cloud classifications resulting from said encoding, deconvolution, and transfer of same documents, respectively, through said cloud classification service.

35. A multi-organization system for commonly training a common on-cloud classification service by labeled given documents submitted from all organizations, while maintaining confidentiality of the documents' contents of each organization from all entities external to that organization, comprising:

a training sub-system in each organization comprising:
- a. a first encoder configured to receive a given document, and to create an embedding of the given document;
- b. a deconvolution unit having a neural network, wherein weights of neurons within the neural network are defined relative to a key, said deconvolution unit being configured to receive said embedding, deconvolve the embedding, thereby to create an activations vector which is then sent for training to the common on-cloud classification service, together with the respective label of that given document;

wherein said key is a unique key which is randomly generated for each document.

36. The multi-organization system of claim 35, wherein upon completion of the common training by labeled classification vectors from all organizations, said common on-cloud classification service is ready to provide confidential documents' classifications to each said organizations.

37. The multi-organization system of claim 36, wherein during run-time labeling of new documents, each organization's sub-system comprising:
- a. a first encoder configured to receive a new un-labeled document, and to create an embedding of the new document;
- b. a deconvolution unit having a neural network, wherein weights of neurons within the neural network are defined relative to said key, said deconvolution unit being configured to receive said embedding, deconvolve the embedding, thereby to create an activations vector which is then sent to the on-cloud classification service, which given the activations vector, returns the label of the document.

38. The system of claim 35, wherein said on-cloud classification service, during training, further receives scrambled documents created by the deconvolution unit, and during run-time, the on-cloud classification service also further receives scrambled documents that are created by the deconvolution unit.

39. The system of claim 35, wherein said embedding is a reduced size of said new document, and wherein said scrambled image is of increased size compared to said embedding.

40. The system of claim 35, wherein a type of said document is selected from text, table, and image.

* * * * *